US008681190B2

(12) United States Patent
Yano et al.

(10) Patent No.: US 8,681,190 B2
(45) Date of Patent: Mar. 25, 2014

(54) LIQUID CRYSTAL DISPLAY

(75) Inventors: Tomoya Yano, Kanagawa (JP); Ken Kikuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 466 days.

(21) Appl. No.: 13/156,835

(22) Filed: Jun. 9, 2011

(65) Prior Publication Data

US 2012/0026210 A1 Feb. 2, 2012

(30) Foreign Application Priority Data

Jul. 27, 2010 (JP) ................................ 2010-168424

(51) Int. Cl.
*G09G 5/10* (2006.01)
*G09G 3/36* (2006.01)
*G06F 3/038* (2013.01)
*G09G 5/00* (2006.01)

(52) U.S. Cl.
USPC .............................. 345/690; 345/87; 345/240

(58) Field of Classification Search
USPC ........................................................ 345/690
See application file for complete search history.

(56) References Cited

U.S. PATENT DOCUMENTS

| | | | | |
|---|---|---|---|---|
| 4,600,274 | A | 7/1986 | Morozumi | |
| 8,237,633 | B2 * | 8/2012 | Miller et al. | 345/76 |
| 2008/0180384 | A1 | 7/2008 | Aoki et al. | |

FOREIGN PATENT DOCUMENTS

| | | |
|---|---|---|
| JP | 4-54207 | 8/1992 |
| JP | 4-355722 | 12/1992 |
| JP | 4354491 | 8/2009 |

OTHER PUBLICATIONS

U.S. Appl. No. 13/181,765, filed Jul. 13, 2011, Kikuchi, et al.
U.S. Appl. No. 13/095,104, filed Apr. 27, 2011, Asano, et al.

* cited by examiner

*Primary Examiner* — Charles V Hicks

(74) *Attorney, Agent, or Firm* — Oblon, Spivak, McClelland, Maier & Neustadt, L.L.P.

(57) ABSTRACT

A liquid crystal display includes: a light source section; a liquid crystal display panel including pixels each configured of sub-pixels of three colors red (R), green (G) and blue (B) and a sub-pixel of a color (Z) with higher luminance than the three colors; and a display control section including an output signal generation section performing a display drive on the sub-pixels of R, G, B and Z with use of the output picture signals. A chromaticity point of the emission light from the light source section is set to a position deviated from a white chromaticity point. In the case where the input picture signals are picture signals indicating white (W), the output signal generation section performs a chromaticity point adjustment to adjust, to the white chromaticity point, a chromaticity point of display light emitted from the liquid crystal display panel based on the emission light.

7 Claims, 19 Drawing Sheets

COMPARATIVE EXAMPLE

COMPARATIVE EXAMPLE

EXAMPLE 1

EXAMPLE 2

EXAMPLE 3

LIQUID CRYSTAL DISPLAY

BACKGROUND

The present disclosure relates to a liquid crystal display with a sub-pixel configuration which includes, for example, sub-pixels of four colors including red (R), green (G), blue (B) and white (W).

In recent years, as displays for flat-screen televisions and portable terminals, active matrix liquid crystal displays (LCDs) in which TFTs (Thin Film Transistors) are arranged for respective pixels are often used. In such liquid crystal displays, typically, pixels are individually driven by line-sequentially writing a picture signal to auxiliary capacitance elements and liquid crystal elements of the pixels from the top to the bottom of a screen.

To reduce power consumption at the time of displaying a picture in a liquid crystal display, there are proposed liquid crystal displays including pixels each configured of sub-pixels of four colors in liquid crystal display panels (for example, refer to Japanese Examined Patent Application Publication Nos. H4-54207 and 114-355722 and Japanese Patent No. 4354491). More specifically, the sub-pixels of four colors are sub-pixels of red (R), green (G) and blue (B) and a sub-pixel of a color (Z; such as white (W) or yellow (Y)) with higher luminance than these three colors. In the case where a picture is displayed with use of picture signals for sub-pixels of such four colors, compared to the case where a picture is displayed by supplying picture signals for three colors R, G and B to each pixel with a three-color RGB sub-pixel configuration in related art, luminance efficiency is allowed to be improved.

Moreover, Japanese Patent No. 4354491 also discloses a liquid crystal display actively controlling the luminance of a backlight based on a display picture (based on the signal level of a picture signal) (performing a dimming process). In the case where such a technique is used, while maintaining display luminance, a reduction in power consumption and a dynamic range expansion are achievable.

SUMMARY

However, in liquid crystal displays, light entering from a backlight to a liquid crystal layer is modulated based on the signal level of a picture signal to control the light amount (luminance) of transmission light (display light). It is known that spectral characteristics of transmission light from the liquid crystal layer typically have tone dependency, and a transmittance peak shifts to a shorter wavelength (a blue light side) with a decrease in the signal level of the picture signal. In a three-color RGB sub-pixel configuration in related art, color filters selectively allowing light in a predetermined wavelength region to pass therethrough are provided for the sub-pixels, respectively. Therefore, even in the case where a chromaticity point at a maximum signal level in a picture signal for each color is used as a reference, a wavelength shift of the above-described transmittance peak does not cause a highly harmful effect.

On the other hand, in a liquid crystal display with the above-described four-color sub-pixel configuration, a sub-pixel of Z has high luminance characteristics; therefore, spectral characteristics of transmission light from the sub-pixel of Z are greatly changed in accordance with the signal level of the picture signal. Accordingly, the chromaticity point of transmission light (display light) from a whole pixel greatly shifts in accordance with the signal level of the picture signal. In particular, in the case where a sub-pixel of W is used as the sub-pixel of Z, the color filter is not provided for the sub-pixel of W; therefore, such a shift of the chromaticity point of display light in accordance with the signal level is large. For example, in the case where a cell thickness or a drive voltage in the sub-pixel of W is set to allow transmittance in the sub-pixel of W to have relatively high liquid crystal spectral characteristics, that is, to allow the transmittance peak to be located around a wavelength region of G, the transmittance peak is located in a wavelength region of B at a lower signal level than a maximum signal level in the sub-pixel of W.

In the liquid crystal display with a four-color RGBZ sub-pixel configuration, a shift of the chromaticity point of display light (a color shift) in accordance with the signal level occurs, thereby causing a decline in image quality. In the case where the above-described active control of backlight luminance is used in combination, advantages such as a reduction in power consumption and a dynamic range expansion may not be sufficiently obtained.

It is desirable to provide a liquid crystal display capable of reducing a decline in image quality due to a color shift in the case where a picture is displayed with use of a four-color RGBZ sub-pixel configuration.

According to an embodiment of the disclosure, there is provided a liquid crystal display including: a light source section; a liquid crystal display panel including a plurality of pixels each configured of sub-pixels of three colors red (R), green (G) and blue (B) and a sub-pixel of a color (Z) with higher luminance than the three colors, and modulating, based on input picture signals corresponding to the three colors R, G and B, emission light from the light source section to display a picture; and a display control section including an output signal generation section which performs a predetermined conversion process based on the input picture signals to generate output picture signals corresponding to four colors R, G, B and Z, and performing a display drive on each of the sub-pixels of R, G, B and Z in the liquid crystal display panel with use of the output picture signals. In this case, a chromaticity point of the emission light from the light source section is set to a position deviated from a white chromaticity point. Moreover, in the case where the input picture signals are picture signals indicating white (W), the output signal generation section performs a chromaticity point adjustment in the above-described conversion process to adjust, to the white chromaticity point, a chromaticity point of display light emitted from the liquid crystal display panel based on the emission light from the light source section. It is to be noted that "in the case where the input picture signals are picture signals indicating W" corresponds to the case where the luminance levels (the signal levels, luminance gradation) of picture signals corresponding to R, G and B are all at maximum.

In the liquid crystal display according to the embodiment of the disclosure, the predetermined conversion process is performed based on the input picture signals corresponding to three colors R, G and B to generate the output picture signals corresponding to four colors R, G, B and Z. At this time, the chromaticity point of emission light from the light source section is set to a position deviated from the white chromaticity point, and in the case where the input picture signals are picture signals indicating W, the chromaticity point adjustment is performed to adjust, to the white chromaticity point, the chromaticity point of display light emitted from the liquid crystal display panel based on the emission light from the light source section. Therefore, even if a peak wavelength region in emission light (transmission light) from the sub-pixel of Z is changed in accordance with the magnitude of the luminance level (signal level) of the output picture signal corresponding to Z, in the case where the input picture signals are the picture signal indicating W, the chromaticity point of display light indicates the white chromaticity point. In other words, a color shift of display light caused by such a change in the peak wavelength region in emission light from the sub-pixel of Z is reduced.

In the liquid crystal display according to the embodiment of the disclosure, the chromaticity point of emission light from the light source section is set to a position deviated from the white chromaticity point and in the case where the input picture signals are picture signals indicating W, the chromaticity point adjustment is performed to adjust, to the white chromaticity point, the chromaticity point of display light emitted from the liquid crystal display panel based on emission light from the light source section; therefore, a color shift of display light caused by a change in the peak wavelength region in emission light from the sub-pixel of Z is allowed to be reduced. Therefore, in the case where a picture is displayed with use of a four-color RGBZ sub-pixel configuration, a decline in image quality caused by the color shift is allowed to be reduced.

Other and further objects, features and advantages of the disclosure will appear more fully from the following description.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION OF THE PREFERRED EMBODIMENTS

A preferred embodiment of the disclosure will be described in detail below referring to the accompanying drawings. Descriptions will be given in the following order.

1. Embodiment (Example of liquid crystal display using RGBW panel)
2. Modification 1 (Example in which yellow pigment is dispersed in W sub-pixel)
3. Modification 2 (Example of liquid crystal display using RGBZ panel)

Embodiment

Whole Configuration of Liquid Crystal Display 1

Figure 1:
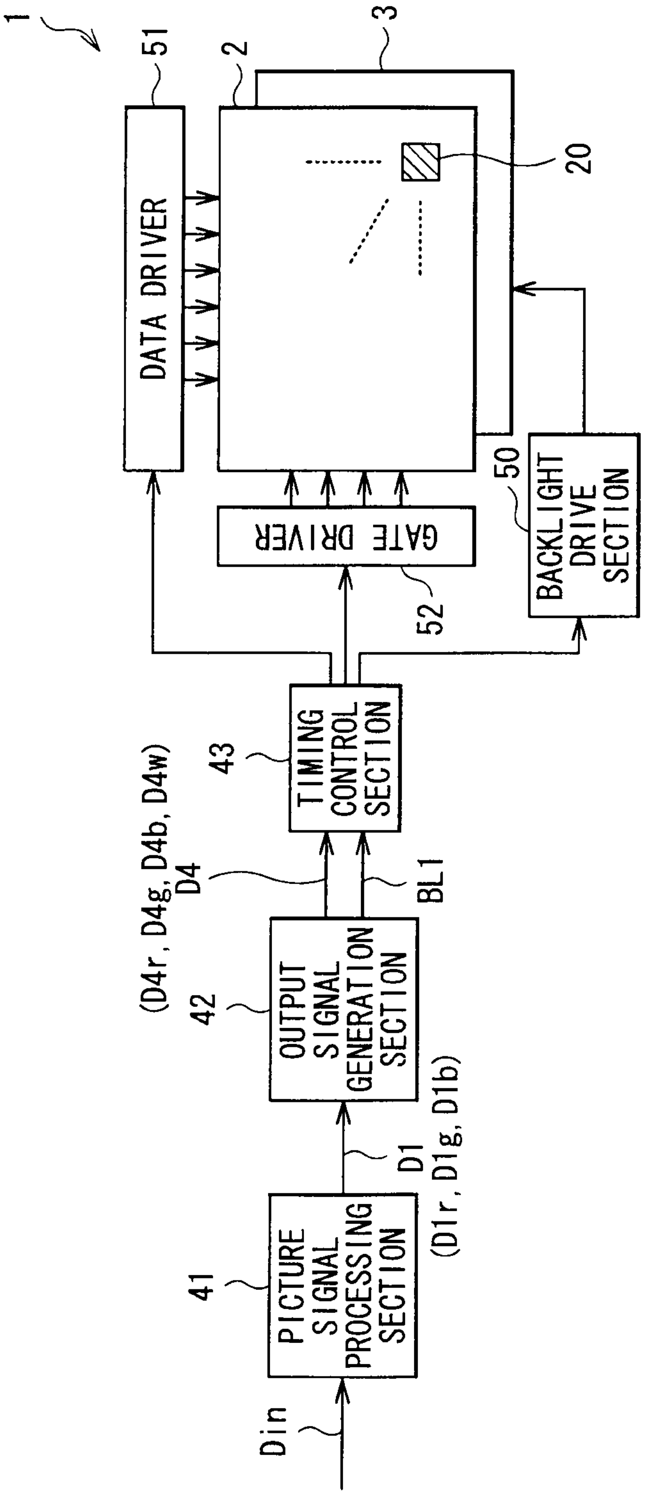
FIG. 1 is a block diagram illustrating a whole configuration of a liquid crystal display according to an embodiment of the disclosure.

FIG. 1 illustrates a whole block configuration of a liquid crystal display (liquid crystal display 1) according to an embodiment of the disclosure.

The liquid crystal display 1 displays a picture based on input picture signals Din applied from outside. The liquid crystal display 1 includes a liquid crystal display panel 2, a backlight 3 (a light source section), a picture signal processing section 41, an output signal generation section 42, a timing control section 43, a backlight drive section 50, a data driver 51 and a gate driver 52. The picture signal processing section 41, the output signal generation section 42, the timing control section 43, the backlight drive section 50, the data driver 51 and the gate driver 52 correspond to specific examples of "a display control section" in the disclosure.

The liquid crystal display panel 2 modulates light emitted from the backlight 3 which will be described later based on the input picture signals Din to display a picture based on the input picture signals Din. The liquid crystal display panel 2 includes a plurality of pixels 20 arranged in a matrix form as a whole.

Figure 2A:
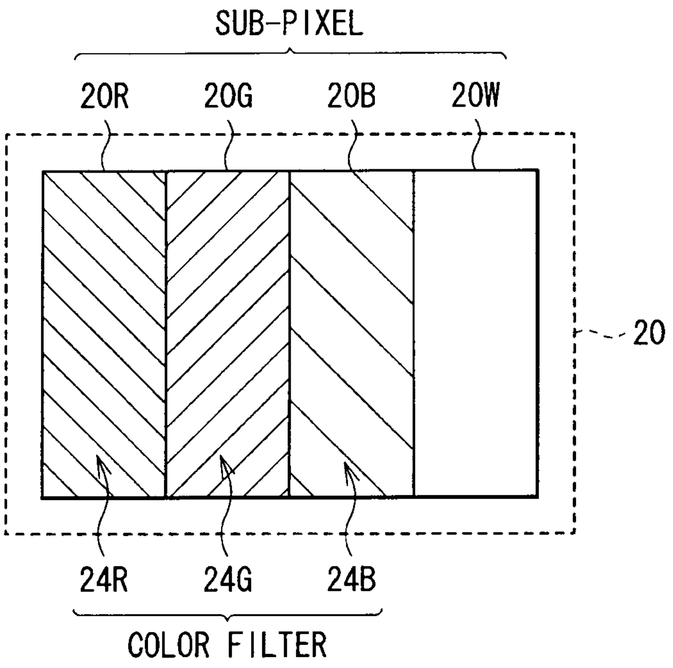
FIGS. 2A and 2B are schematic plan views illustrating sub-pixel configuration examples of a pixel illustrated in FIG. 1.
Figure 2B:
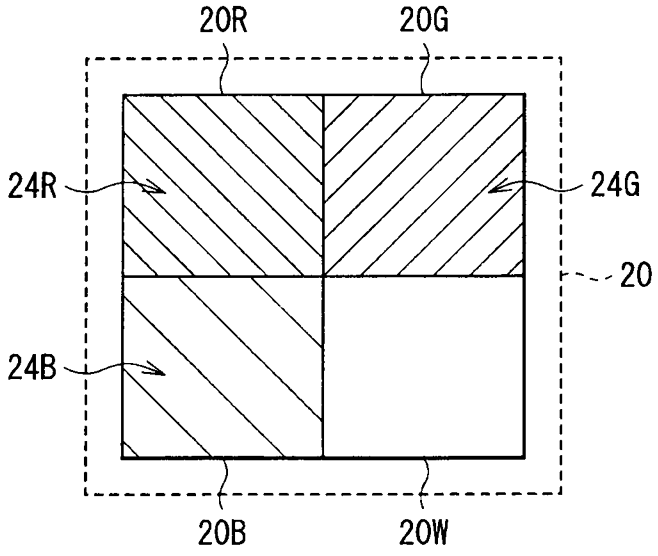

FIGS. 2A and 2B illustrate schematic plan views of sub-pixel configuration examples in each pixel 20. Each pixel 20 includes a sub-pixel 20R corresponding to a red (R) color, a sub-pixel 20G corresponding to a green (G) color, a sub-pixel 20B corresponding to a blue (B) color and a sub-pixel 20W of white (W) with higher luminance than these three colors. In the sub-pixels 20R, 20G, 20B and 20W of the four colors R, G, B and W, the sub-pixels 20R, 20G and 20B corresponding to three colors R, G and B include color filters 24R, 24G and 24B corresponding to the colors R, G and B, respectively. In other words, the color filter 24R corresponding to R is provided for the sub-pixel 20R corresponding to R, the color filter 24G corresponding to G is provided for the sub-pixel 20G corresponding to G, and the color filter 24B corresponding to B is provided for the sub-pixel 20B corresponding to B. On the other hand, a color filter is not provided for the sub-pixel 20W corresponding to W.

In an example illustrated in FIG. 2A, in the pixel 20, four sub-pixels 20R, 20G, 20B and 20W are arranged in this order in line (for example, along a horizontal (H) direction). On the other hand, in an example illustrated in FIG. 2B, in the pixel 20, four sub-pixels 20R, 20G, 20B and 20W are arranged in a matrix with 2 rows and 2 columns. However, the arrangement of the four sub-pixels 20R, 20G, 20B and 20W in the pixel 20 is not limited thereto, and the sub-pixels 20R, 20G, 20B and 20W may be arranged in any other form.

As the pixel 20 has such a four-color sub-pixel configuration in the embodiment, as will be described in detail later, compared to a three-color RGB sub-pixel configuration in related art, luminance efficiency at the time of displaying a picture is allowed to be improved.

Figure 3:
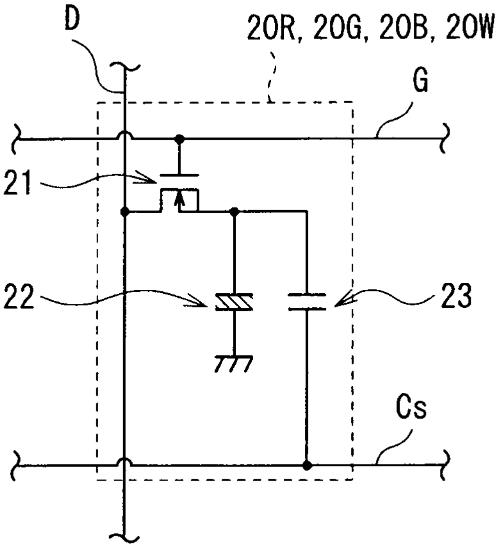
FIG. 3 is a circuit diagram illustrating a specific configuration example of each sub-pixel illustrated in FIGS. 2A and 2B.

FIG. 3 illustrates a circuit configuration example of a pixel circuit in each of the sub-pixels 20R, 20G, 20B and 20W. Each of the sub-pixels 20R, 20G, 20B and 20W includes a liquid crystal element 22, a TFT element 21 and an auxiliary capacitance element 23. A gate line G for line-sequentially selecting a pixel to be driven, a data line D for supplying a picture voltage (a picture voltage supplied from the data driver 51 which will be described later) to the pixel to be driven and an auxiliary capacitance line Cs are connected to each of the sub-pixels 20R, 20G, 20B and 20W.

The liquid crystal element 22 performs a display operation in response to a picture voltage supplied from the data line D to one end thereof through the TFT element 21. The liquid crystal element 22 is configured by sandwiching a liquid crystal layer (not illustrated) made of, for example, a VA (Vertical Alignment) mode or TN (Twisted Nematic) mode liquid crystal between a pair of electrodes (not illustrated). One (one end) of the pair of electrodes in the liquid crystal element 22 is connected to a drain of the TFT element 21 and one end of the auxiliary capacitance element 23, and the other (the other end) of the pair of electrodes is grounded. The auxiliary capacitance element 23 is a capacitance element for stabilizing an accumulated charge of the liquid crystal element 22. One end of the auxiliary capacitance element 23 is connected to the one end of the liquid crystal element 22 and the drain of the TFT element 21, and the other end of the auxiliary capacitance element 23 is connected to the auxiliary capacitance line Cs. The TFT element 21 is a switching element for supplying a picture voltage based on picture signals D1 to the one end of the liquid crystal element 22 and the one end of the auxiliary capacitance element 23, and is configured of a MOS-FET (Metal Oxide Semiconductor-Field Effect Transistor). A gate and a source of the TFT element 21 are connected to the gate line G and the data line D, respectively, and the drain of the TFT element 21 is connected to the one end of the liquid crystal element 22 and the one end of the auxiliary capacitance element 23.

The backlight 3 is a light source section applying light to the liquid crystal display panel 2, and includes, for example, a CCFL (Cold Cathode Fluorescent Lamp), an LED (Light Emitting Diode) or the like as a light-emitting element. As will be described later, the backlight 3 performs a light-emission drive (active control of light emission luminance) based on the luminance level (signal level) of the input picture signals Din.

In the embodiment, a chromaticity point of emission light from the backlight 3 is set to a position deviated from a white chromaticity point. More specifically, in this case, the chromaticity point of emission light from the backlight 3 is set to a position closer to yellow (Y) than the white chromaticity point. For example, in the case where a white LED configured of a blue LED in combination with a phosphor for red light emission and a phosphor for green light emission is used as a light source, such setting of the chromaticity point of emission light is allowed to be achieved in the following manner. The additive amounts of the above-described phosphors are adjusted to relatively increase a red component and a green component in spectral characteristics of emission light from the backlight 3, thereby allowing the chromaticity point of the emission light to be set closer to Y than the white chromaticity point.

Examples of the phosphor for red light emission in this case include (Ca, Sr, Ba)S:$Eu^{2+}$, (Ca, Sr, $Ba)_2Si_5N_8$:$Eu^{2+}$ and $CaAlSiN_3$:$Eu^{2+}$. Moreover, examples of the phosphor for green light emission include $SrGa_2S_4$:$Eu^{2+}$ and $Ca_3Sc_2Si_3O_{12}$:$Ce^{3+}$.

The picture signal processing section 41 performs, for example, predetermined image processing (such as a sharpness process or a gamma correction process) for an improvement in image quality on the input picture signals Din including pixel signals corresponding to three colors R, G and B to generate picture signals D1 including pixel signals corresponding to three colors R, G and B (a pixel signal D1*r* for R, a pixel signal D1*g* for G and a pixel signal D1*b* for B).

The output signal generation section 42 performs predetermined signal processing (a conversion process) based on the picture signals D1 (D1*r*, D1*g* and D1*b*) supplied from the picture signal processing section 41 to generate a lighting signal BL1 indicating a light emission level (a lighting level) in the backlight 3 and picture signals D4 (a pixel signal D4*r* for R, a pixel signal D4*g* for G, a pixel signal D4*b* for B and a pixel signal D4*w* for W) as output picture signals. A specific configuration of the output signal generation section 42 will be described later (refer to FIG. 4 to FIGS. 8A to 8C).

The timing control section 43 controls drive timings of the backlight drive section 50, the gate driver 52 and the data driver 51, and supplies, to the data driver 51, the picture signals D4 supplied from the output signal generation section 42.

The gate driver 52 line-sequentially drives the pixels 20 (the sub-pixels 20R, 20G, 20B and 20W) in the liquid crystal display panel 2 along the above-described gate line G in response to timing control by the timing control section 43. On the other hand, the data driver 51 supplies, to each of the pixels 20 (the sub-pixels 20R, 20G, 20B and 20W) in the liquid crystal display panel 2, a picture voltage based on the picture signals D4 supplied from the timing control section 43. In other words, the pixel signal D4*r* for R, the pixel signal D4*g* for G, the pixel signal D4*b* for B and the pixel signal D4*w* for W are supplied to the sub-pixels 20R, 20G, 20B and 20W, respectively. More specifically, the data driver 51 performs D/A (digital/analog) conversion on the picture signals D4 to generate picture signals (the above-described picture voltage) as analog signals to output the analog signals to the pixels 20 (the sub-pixels 20R, 20G, 20B and 20W). Therefore, a display drive based on the picture signals D4 is performed on the pixels 20 (the sub-pixels 20R, 20G, 20B and 20W) in the liquid crystal display panel 2.

The backlight drive section 50 performs a light-emission drive (a lighting drive) on the backlight 3 based on the lighting signal BL1 supplied from the output signal generation section 42 in response to timing control by the timing control section 43. More specifically, as will be described in detail later, the light-emission drive (active control of light emission luminance) based on the luminance levels (signal levels) of the input picture signals Din is performed.

[Specific Configuration of Output Signal Generation Section 42]

Figure 4:
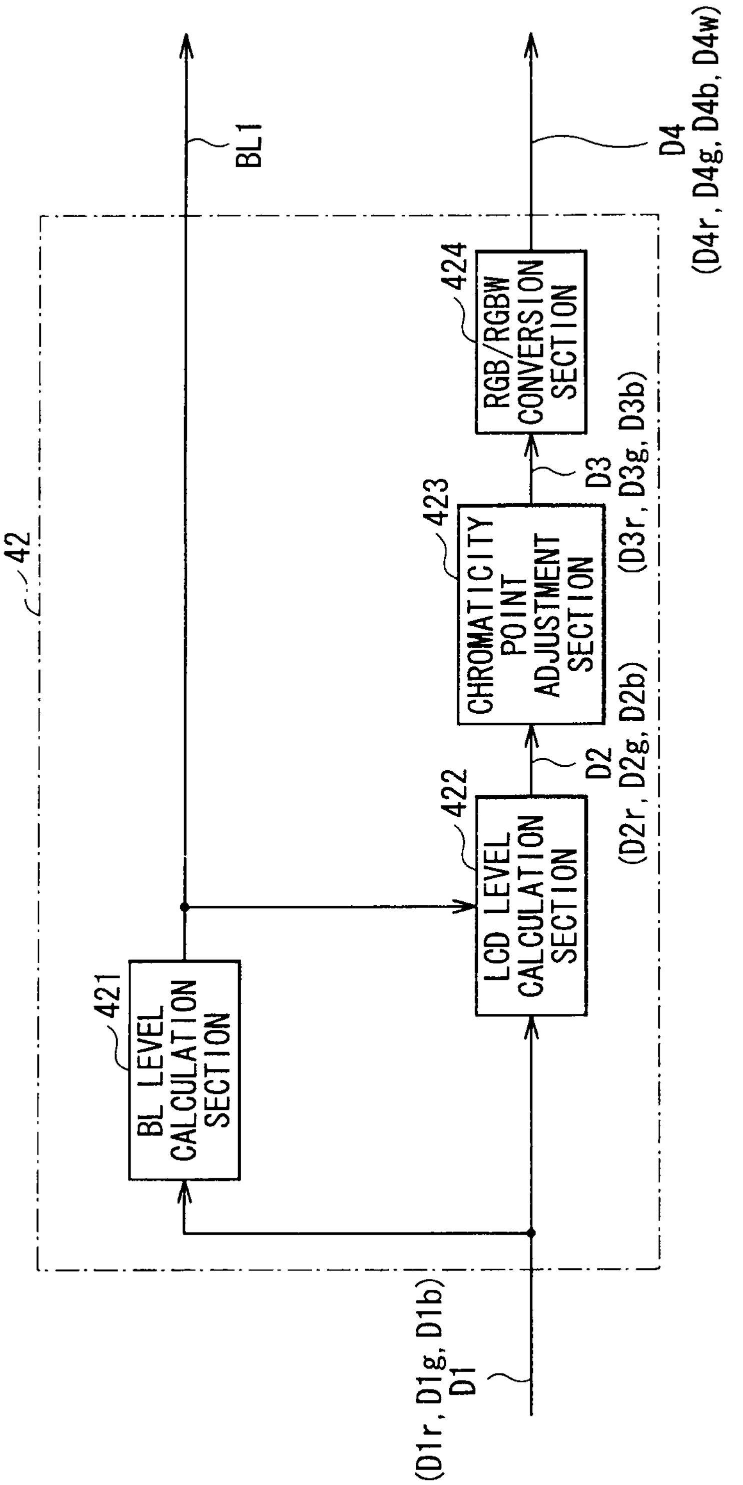
FIG. 4 is a block diagram illustrating a specific configuration of an output signal generation section illustrated in FIG. 1.

Next, referring to FIG. 4 to FIGS. 8A to 8C, a specific configuration of the output signal generation section 42 will be described below. FIG. 4 illustrates a block configuration of the output signal generation section 42. The output signal generation section 42 includes a BL level calculation section 421, an LCD level calculation section 422, a chromaticity point adjustment section 423 and a RGB/RGBW conversion section 424.

The BL level calculation section 421 generates the lighting signal BL1 in the backlight 3 based on the picture signals D1 (D1*r*, D1*g* and D1*b*). More specifically, the BL level calculation section 421 analyzes the luminance levels (signal levels) of the picture signals D1 to obtain the lighting signal BL1 corresponding to the luminance levels. In other words, for example, a pixel signal with the highest luminance level is extracted from the pixel signal D1*r* for R, the pixel signal D1*g* for G and the pixel signal D1*b* for B to generate the lighting signal BL1 corresponding to the luminance level of the extracted pixel signal.

The LCD level calculation section 422 generates picture signals D2 (a pixel signal D2*r* for R, a pixel signal D2*g* for G and a pixels signal D2*b* for B) based on the picture signals D1 (D1*r*, D1*g* and D1*b*) and the lighting signal BL1 supplied from the BL level calculation section 421. More specifically, the LCD level calculation section 422 performs a predetermined diming process based on the picture signals D1 and the lighting signal BL1 (in this case, the LED level calculation section 422 divides the signal levels of the picture signals D1 by the signal level of the lighting signal BL1) to generate the picture signals D2. More specifically, the LCD level calculation section 422 generates the picture signals D2 by the following expressions (1) to (3).

$$D2r=(D1r/BL1) \tag{1}$$

$$D2g=(D1g/BL1) \tag{2}$$

$$D2b=(D1b/BL1) \tag{3}$$

The chromaticity point adjustment section 423 performs a predetermined chromaticity point adjustment on the picture signals D2 (D2*r*, D2*g* and D2*b*) to generate picture signals D3 (D3*r*, D3*g* and D3*b*). More specifically, in the case where the picture signals D2 (D1) are picture signals indicating white (W), the chromaticity point adjustment is performed to adjust, to a white chromaticity point, the chromaticity point of display light emitted from the liquid crystal display panel 2 based on emission light from the backlight 3. It is to be noted that "in the case where the picture signals D2 (D1) are picture signals indicating W" corresponds to the case where the luminance levels (signal levels, luminance gradation) of the pixel signals D2*r*, D2*g* and D2*b* (D1*r*, Dig and D1*b*) are all at maximum.

In this case, the chromaticity point adjustment section 423 performs such a chromaticity point adjustment with use of, for example, a conversion matrix $M_{d2\rightarrow d3}$ specified by the following expression (4). In other words, the picture signals D3 (the pixel signals D3*r*, D3*g* and D3*b*) are generated by multiplying the picture signals D2 (the pixel signals D2*r*, D2*g* and D2*b*) by the conversion matrix $M_{d2\rightarrow d3}$ (by performing a matrix operation). As indicated in the expression (4), the conversion matrix $M_{d2\rightarrow d3}$ is allowed to be obtained by a multiplication (a matrix operation) of a conversion matrix $M_{d2\rightarrow XYZ}$ by a conversion matrix $M_{XYZ\rightarrow d3}$. The conversion matrix $M_{d2\rightarrow XYZ}$ is a conversion matrix from the picture signals D2 to tristimulus values (X, Y, Z) in the white chromaticity point. On the other hand, the conversion matrix $M_{XYZ\rightarrow d3}$ is a conversion matrix from the tristimulus values (X, Y, Z) to the picture signals D3, and is allowed to be determined by the following expression (5). In the expression (5), (Xw, Yw, Zw) indicate tristimulus values in the sub-pixel 20W, and (Wr, Wg, Wb) indicate values obtained by replacing the signal level in the sub-pixel 20W with the signal levels in the sub-pixels 20R, 20G and 20B. The operation (a chromaticity point adjustment operation) in the chromaticity point adjustment section 423 will be described in detail later.

$$M_{d2\rightarrow d3}=(M_{d2\rightarrow XYZ})\times(M_{XYZ\rightarrow d3}) \tag{4}$$

$$\begin{pmatrix} W_r \\ W_g \\ W_b \end{pmatrix} = M_{XYZ\rightarrow d3}\begin{pmatrix} X_w \\ Y_w \\ Z_w \end{pmatrix} \tag{5}$$

(RGB/RGBW Conversion Section 424)

The RGB/RGBW conversion section 424 performs a predetermined RGB/RGBW conversion process (a color conversion process) on the picture signals D3 (D3*r*, D3*g* and D3*b*) corresponding to three colors R, G and B supplied from the chromaticity point adjustment section 423. Therefore, the picture signals D4 (D4*r*, D4*g*, D4*b* and D4*w*) corresponding to four colors R, G, B and W are generated.

Figure 5:
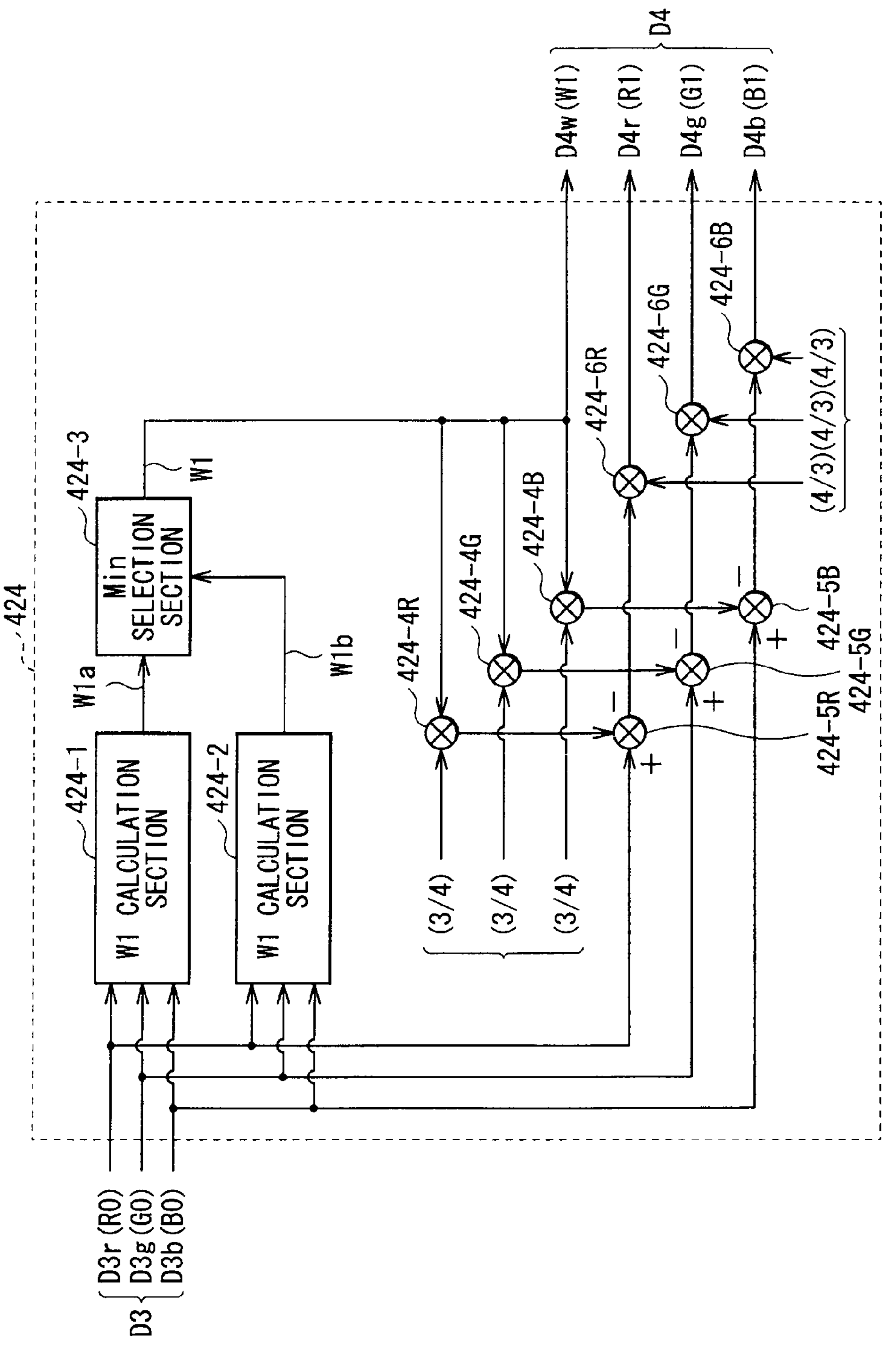
FIG. 5 is a block diagram illustrating a specific configuration of a RGB/RGBW conversion section illustrated in FIG. 4.

FIG. 5 illustrates a block configuration of the RGB/RGBW conversion section 424. The RGB/RGBW conversion section 424 includes a W1 calculation section 424-1, a W1 calculation section 424-2, a Min selection section 424-3, multiplication sections 424-4R, 424-4G and 424-4B, subtraction sections 424-5R, 424-5G and 424-5B and multiplication sections 424-6R, 424-6G and 424-6B. It is to be noted that the pixel signals D3*r*, D3*g* and D3*b* as input signals are referred to as R0, G0 and B0, respectively, and the pixel signals D4*r*, D4*g*, D4*b* and D4*w* as output signals are referred to as R1, G1, B1 and W1, respectively.

First, a reason for using the four-color sub-pixel configuration and expressions in the color conversion process will be described referring to, as an example, the case where a sub-pixel 20Z of a color (Z) with higher luminance than the three colors R, G and B is used as a broader concept of the sub-pixel 20W. Examples of the color (Z) with higher luminance include yellow (Y) and white (W). It is to be noted that the above-described pixel signals D4$w$ and W1 are referred to as pixel signals D4$z$ and Z1.

(Reason for Using Four-Color Sub-Pixel Configuration)

First, the four-color sub-pixel configuration including sub-pixels 20R, 20G, 20B and 20Z (20W) is used in order to improve luminance efficiency by using high luminance characteristics (higher luminance than those of the sub-pixels 20R, 20G and 20B) of the sub-pixel 20Z (20W). Therefore, to achieve, in a four-color RGBZ(W) sub-pixel configuration, the same luminance as that in the three-color RGB sub-pixel configuration, the luminance level of the picture signal for each color is smaller than that in the three-color sub-pixel configuration. More specifically, for example, as illustrated by an arrow in FIG. 6(A), compared to the luminance levels of the pixel signals R0, G0 and B0 to be subjected to a RGB/RGBZ(W) conversion process, the luminance levels of the pixel signals R1, G1 and B1 as resultants of the RGB/RGBZ (W) conversion process are smaller.

On the other hand, for example, as illustrated in FIGS. 2A and 2B, in the four-color sub-pixel configuration, as the sub-pixel 20Z (20W) is additionally arranged, the area of each of the sub-pixels 20R, 20G and 20B is smaller than that in the three-color sub-pixel configuration. Therefore, in the case where high luminance characteristics of the sub-pixel 20Z (20W) are not allowed to be used, the luminance levels of the pixel signals R1, G1 and B1 are larger than those of the pixel signals R0, G0 and B0. FIG. 6B illustrates an example in this case, and illustrates an example in which in the case where the sub-pixel 20Z is the sub-pixel 20W, the pixel signals R0, G0 and B0 configure a red-only signal (only the pixel signal R0 has an effective luminance level (which is not 0)). In this case, white (W) is a color appearing when the luminance levels of R, G and B are the same as one another; therefore, in the case where the pixel signals R0, G0 and B0 configure the red-only signal, the luminance levels of the pixel signals R1, G1 and B1 are not allowed to be reduced with use of the sub-pixel 20W. Therefore, in this case, as described above, as the area of the sub-pixel 20R is relatively smaller than that in the three-color sub-pixel configuration, as illustrated by an arrow in FIG. 6B, it is necessary to increase the luminance level of the pixel signal R1 to a level higher than that of the pixel signal R0.

Accordingly, in the four-color sub-pixel configuration, as the areas of the sub-pixels 20R, 20G and 20B are smaller, to achieve the same luminance as that in the three-color sub-pixel configuration, it is necessary to increase the luminance levels of the pixel signals R1, G1 and B1 to a level higher than those of the pixel signals R0, G0 and B0. However, as illustrated in FIG. 6A, in the case where high luminance characteristics of the sub-pixel 20Z (20W) are allowed to be used, the luminance levels of the pixel signals R1, G1 and B1 are allowed to be reduced by distributing parts of the luminance levels of the pixel signals R0, G0 and B0 to the luminance level of the pixel signal Z1 (W1). In other words, the luminance levels of the pixel signals R1, G1, B1 and Z1 (W1) are allowed to be reduced to a level lower than maximum luminance levels of the pixel signals R0, G0 and B0.

Figure 6A:
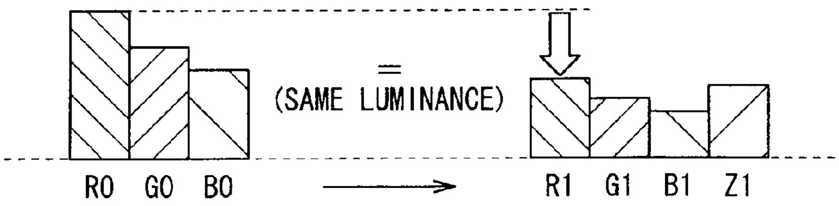
FIGS. 6A and 6B are schematic views for describing an example of a conversion operation in the RGB/RGBW conversion section.
Figure 6B:
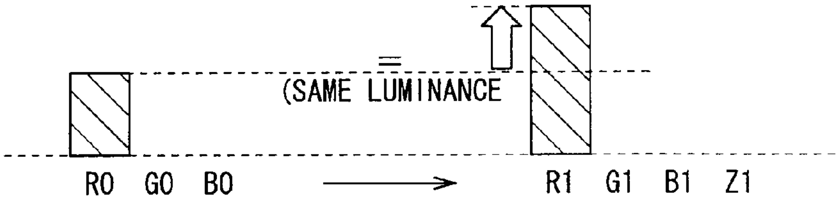

However, when the distributed amounts of the luminance levels to the pixel signal Z1 at this time are too large, for example, as illustrated in FIG. 6A, the luminance level of the pixel signal Z1 is higher than the luminance levels of the pixel signals R1, G1 and B1. In this case, when the BL level calculation section 421 generates the lighting signal BL1 based on the pixel signals D1$r$, D1$g$ and D1$b$ (R1, G1 and B1), as described above, for example, a pixel signal with the highest value selected from the pixel signals D1$r$, D1$g$ and D1$b$ is used. Therefore, it is necessary to satisfy the following expression (6), that is, to satisfy a condition that the luminance level of the pixel signal Z1 is equal to or smaller than the highest luminance level in the pixel signals R1, G1 and B1.

$$Z1 \leq \mathrm{Max}(R1, G1, B1) \tag{6}$$

(Expressions in RGB/RGBZ Conversion Process)

Figure 7A:
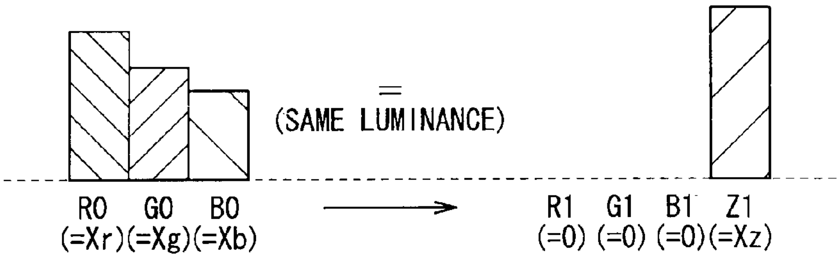
FIGS. 7A and 7B are schematic views for describing another example of the conversion operation in the RGB/RGBW conversion section.
Figure 7B:
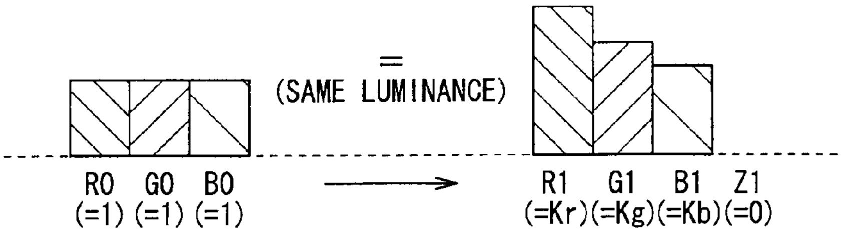

First, as illustrated in FIGS. 7A and 7B, the following relationships (expressions (7) and (8)) are established between the luminance levels of the pixel signals R0, G0 and B0 to be subjected to the RGB/RGBZ conversion process and the luminance levels of the pixel signals R1, G1, B1 and Z1 as resultants of the RGB/RGBZ conversion process. In other words, as illustrated in FIG. 7A, in the case of (R0, G0, B0)=(Xr, Xg, Xb), (R1, G1, B1, Z1)=(0, 0, 0, Xz) is established. Moreover, as illustrated in FIG. 7B, in the case of (R0, G0, B0)=(1, 1, 1), (R1, G1, B1, Z1)=(Kr, Kg, Kb, 0) is established. It is to be noted that the case of Xr=Xg=Xb corresponds to the case where the sub-pixel 20Z is the sub-pixel 20W of white. Moreover, in the case where a spectrum in the backlight 3 is the same as that in the three-color RGB sub-pixel configuration in related art, and the widths (sub-pixel widths) of the sub-pixels 20R, 20G, 20B and 20Z are the same as one another, Kr=Kg=Kb is established.

$$(R0, G0, B0) = (Xr, Xg, Xb) = (R1, G1, B1, Z1) = (0,0,0,Xz) \tag{7}$$

$$(R0, G0, B0) = (1,1,1)(R1, G1, B1, Z1) = (Kr, Kg, Kb, 0) \tag{8}$$

In this case, the luminance levels of the pixel signals R1, G1 and B1 as resultants of the RGB/RGBZ conversion process are represented by the above-described expressions (7) and (8), the following expressions (9) to (11) are established. It is to be noted that the luminance levels of the pixel signals R1, G1 and B1 are not allowed to be set to minus (negative) values; therefore, it is necessary to satisfy (R1, G1, B1)≥0 in addition to the expressions (9) to (11).

$$\begin{cases} R1 = \left(R0 - \frac{X_r}{X_z} Z1\right) K_r \geqq 0 & (9) \\ G1 = \left(G0 - \frac{X_g}{X_z} Z1\right) K_g \geqq 0 & (10) \\ B1 = \left(B0 - \frac{X_b}{X_z} Z1\right) K_b \geqq 0 & (11) \end{cases}$$

In this case, the maximum value of Z1 in the case where all of the above-described expressions (9) to (11) are satisfied is one candidate value for Z1 generated as a final value. In the case where the candidate value in this case is referred to as Z1$a$, Z1$a$ is allowed to be determined with use of a condition that values in parentheses in the expressions (9) to (11) are equal to or larger than 0, and Z1$a$ is specified by the following expression (12). On the other hand, as illustrated in the above-described expression (6), it is necessary to satisfy the condition that Z1 is equal to or smaller than the highest luminance level in R1, G1 and B1. A candidate value Z1$b$ for Z1 determined under the condition is determined in the following manner. Under the condition of Z1$b$=Max(R1, G1, B1), Z1$b$=R1, Z1$b$=G1 and Z1$b$=B1 are established in the case of Max(R1, G1, B1)=R1, Max(R1, G1, B1)=G1 and Max(R1, G1, B1)=B1, respectively. Then, these expressions are substituted into the above-described expressions (9) to (11) to determine Z1*b*, Z1*b* is specified by the following expression (13).

$$\begin{cases} Z1a = \min\left(\frac{X_z}{X_r}R0,\ \frac{X_z}{X_g}G0,\ \frac{X_z}{X_b}B0\right) & (12) \\ Z1b = \max\left(\frac{R0}{\left(\frac{1}{K_r}+\frac{X_r}{X_z}\right)},\ \frac{G0}{\left(\frac{1}{K_g}+\frac{X_g}{X_z}\right)},\ \frac{B0}{\left(\frac{1}{K_b}+\frac{X_b}{X_z}\right)}\right) & (13) \end{cases}$$

In the case where when Z1*b* determined by the above-described expression (13) is substituted into Z1 in the above-described expressions (9) to (11), the expressions (9) and (11) are established, Z1*b* at this time is Z1 determined as a final value (Z1 as an optimally distributed value). In this case, Z1*b* at this time is a value equal to or smaller than Z1*a* determined by the above-described expression (12).

On the other hand, in the case where when Z1*b* determined by the above-described expression (13) is substituted into Z1 in the above-described expressions (9) to (11), the expressions (9) and (11) are not established, Z1*a* determined by the above-described expression (12) is a value smaller than Z1*b* at this time, because not establishing the expressions (9) to (11) means that any of R1, G1 and B1 has a negative value. As described above, Z1*a* determined by the expression (12) allows all of R1, G1 and B1 in the expressions (9) to (11) to have positive (plus) values; therefore, it is obvious from the expressions (9) to (11) that Z1*a* at this time is smaller than Z1*b* determined by the expression (13). At this time, all values of coefficients Kr, Kg and Kb in the expressions (9) to (11) are positive values. Accordingly, it is obvious that in the RGB/RGBZ conversion process, it is only necessary to select a smaller value as Z1 as a final value from Z1*a* determined by the above-described expression (12) and Z1*b* determined by the above-described expression (13).

(Expressions in RGB/RGBW Conversion Process)

Next, expressions in the RGB/RGBW conversion process in the whole RGB/RGBW conversion section 424 in the case where the sub-pixel configuration including the sub-pixels 20R, 20G, 20B and 20W according to the embodiment is used will be described below based on the above description.

Figure 8A:
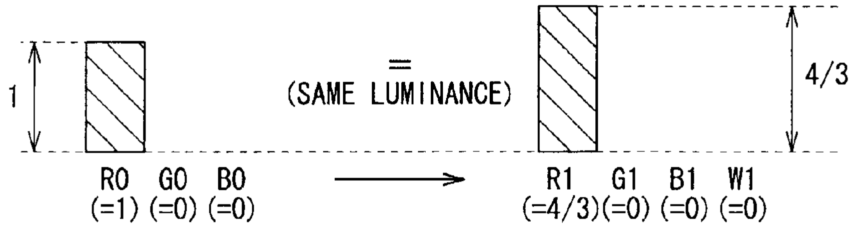
FIGS. 8A, 8B and 8C are schematic views for describing still another example of the conversion operation in the RGB/RGBW conversion section.

First, the width (sub-pixel width) of each of the sub-pixels 20R, 20G, 20B and 20W is ¼ of the width (pixel width) of the pixel 20. Therefore, the area of each of the sub-pixels 20R, 20G, 20B and 20W are reduced to ¾ of the area of each sub-pixel in the three-color RGB sub-pixel configuration (in which the width of each sub-pixel is ⅓ of the pixel width). Therefore, in the four-color RGBW sub-pixel configuration like the embodiment, in the case where the same luminance level as that in the three-color sub-pixel configuration in related art is achieved only by the sub-pixels 20R, 20G and 20B without the sub-pixel 20W, the following occurs. For example, as illustrated in FIG. 8A, in the case of (R0, G0, B0)=(1, 0, 0), (R1, G1, B1, W1)=(4/3, 0, 0, 0) is established, and a 4/3-times luminance level is necessary. On the other hand, in the case where the luminance level is used as it is (in this case, R1=1), the luminance level is reduced to ¾.

Figure 8B:
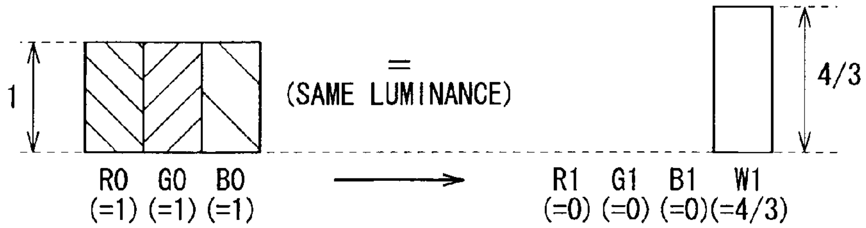

Moreover, as described above, as the color filter is not provided for the sub-pixel 20W corresponding to W, the same luminance level as that of white light synthesized by the sub-pixels 20R, 20G and 20B corresponding to three colors R, G and B is allowed to be obtained only by the sub-pixel 20W. Therefore, for example, as illustrated in FIG. 8B, in the case of (R0, G0, B0)=(1, 1, 1), (R1, G1, B1, W1)=(0, 0, 0, 4/3) is established.

Figure 8C:
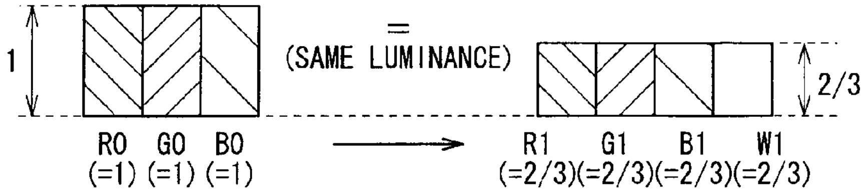

Therefore, for example, as illustrated in FIG. 8C, in the case of (R0, G0, B0)=(1, 1, 1), (R1, G1, B1, W1)=(⅔, ⅔, ⅔, ⅔) is allowed to be established. In other words, in the four-color RGBW sub-pixel configuration, the same luminance level as that in the three-color RGB sub-pixel configuration in related art is achievable with ⅔ of the luminance level in each color. Therefore, in the above-described RGB/RGBZ conversion, the following expressions (14) and (15) are established.

$$Xr=Xg=Xb=1, Xz=4/3 \quad (14)$$

$$Kr=Kg=Kb=4/3 \quad (15)$$

Moreover, the above-described expressions (9) to (11) are allowed to be represented by the following expressions (16) to (18). Further, the expressions (12) and (13) specifying the candidate values Z1*a* and Z1*b* for Z1 are allowed to be represented by the following expressions (19) and (20) as expressions specifying candidate values W1*a* and W1*b* for W1.

$$\begin{cases} R1 = \left(R0 - \frac{3}{4}W1\right)\times(4/3) \geqq 0 & (16) \\ G1 = \left(G0 - \frac{3}{4}W1\right)\times(4/3) \geqq 0 & (17) \\ B1 = \left(B0 - \frac{3}{4}W1\right)\times(4/3) \geqq 0 & (18) \end{cases}$$

$$\begin{cases} W1a = \min\left(\frac{4}{3}R0,\ \frac{4}{3}G0,\ \frac{4}{3}B0\right) & (19) \\ W1b = \max\left(\frac{R0}{\left(\frac{3}{2}\right)},\ \frac{G0}{\left(\frac{3}{2}\right)},\ \frac{B0}{\left(\frac{3}{2}\right)}\right) & (20) \end{cases}$$

Next, referring to FIG. 5 again, each block in the RGB/RGBW conversion section 424 will be described below based on the above description.

The W1 calculation section 424-1 determines W1*a* as a candidate value for W1 with use of the above-described expression (19) based on the pixel signals D3*r*, D3*g* and D3*b* (R0, G0 and B0).

The W1 calculation section 424-2 determines W1*b* as a candidate value for W1 with use of the above-described expression (20) based on the pixel signals D3*r*, D3*g* and D3*b* (R0, G0 and B0).

The Min selection section 424-3 selects a smaller value from W1*a* supplied from the W1 calculation section 424-1 and W1*b* supplied from the W1 calculation section 424-2 to output the selected value as W1 which is a final value (the pixel signal D4*w*).

The multiplication sections 424-4R, 424-4G and 424-4B multiply W1 supplied from the Min selection section 424-3 by a preset constant (¾) to output a resultant.

The subtraction section 424-5R subtracts an output value (a multiplication value) from the multiplication section 424-4R from the pixel signal D3*r* (R0) to output a resultant. The subtraction section 424-5G subtracts an output value (a multiplication value) from the multiplication section 424-4G from the pixel signal D3*g* (G0) to output a resultant. The subtraction section 424-5B subtracts an output value (a multiplication value) from the multiplication section 424-4B from the pixel signal D3*b* (B0) to output a resultant.

The multiplication section 424-6R multiplies the preset constant (4/3) by an output value (a subtraction value) from the subtraction section 424-5R to output a resultant as the pixel signal D4*r* (R1). The multiplication section 424-6G multiplies the preset constant (4/3) by an output value (a subtraction value) from the subtraction section 424-5G to output a resultant as the pixel signal D4*g* (G1). The multiplication section 424-6B multiplies the present constant (4/3) by an output value (a subtraction value) from the subtraction section 424-5B to output a resultant as the pixel signal D4*b* (B1).

[Functions and Effects of Liquid Crystal Display 1]

Next, functions and effects of the liquid crystal display 1 according to the embodiment will be described below.

(1. Summary of Display Operation)

In the liquid crystal display 1, as illustrated in FIG. 1, first, the picture signal processing section 41 performs predetermined image processing on the input picture signals Din to generate the picture signals D1 (D1*r*, D1*g* and D1*b*). Next, the output signal generation section 42 performs predetermined signal processing on the picture signals D1. Therefore, the lighting signal BL1 in the backlight 3 and the picture signals D4 (D4*r*, D4*g*, D4*b* and D4*z*) in the liquid crystal display panel 2 are generated.

Next, the picture signals D4 and the lighting signal BL1 generated in such a manner are supplied to the timing control section 43. The picture signals D4 are supplied from the timing control section 43 to the data driver 51. The data driver 51 performs D/A conversion on the picture signals D4 to generate a picture voltage as an analog signal. Then, a display drive operation is performed by a drive voltage supplied from the gate driver 52 and the data driver 51 to the pixels 20 (the sub-pixels 20R, 20G, 20B and 20W). Therefore, a display drive based on the picture signals D4 (D4*r*, D4*g*, D4*b* and D4*w*) is performed on the pixels 20 (the sub-pixels 20R, 20G, 20B and 20W) in the liquid crystal display panel 2.

More specifically, as illustrated in FIG. 3, ON/OFF operations of the TFT element 21 are switched in response to a selection signal supplied from the gate driver 52 through the gate line G. Therefore, conduction is selectively established between the data line D and the liquid crystal element 22 and the auxiliary capacitance element 23. As a result, a picture voltage based on the picture signals D4 supplied from the data driver 51 is supplied to the liquid crystal element 22, and a line-sequential display drive operation is performed.

On the other hand, the lighting signal BL1 is supplied from the timing control section 43 to the backlight drive section 50. The backlight drive section 50 performs a light-emission drive (a lighting drive) on each light source (each light-emitting element) in the backlight 3 based on the lighting signal BL1. More specifically, a light-emission drive (active control of light emission luminance) based on the luminance levels (signal levels) of the input picture signals Din is performed.

At this time, in the pixels 20 (the sub-pixels 20R, 20G, 20B and 20W) to which the picture voltage is supplied, illumination light from the backlight 3 is modulated in the liquid crystal display panel 2 to be emitted as display light. Thus, a picture based on the input picture signals Din is displayed on the liquid crystal display 1.

At this time, in the embodiment, a picture is displayed based on the picture signals corresponding to the sub-pixels 20R, 20G, 20B and 20W of four colors, thereby improving luminance efficiency, compared to the case where a picture is displayed based on picture signals corresponding to sub-pixels of three colors R, G and B in related art. Moreover, when an active drive of light emission luminance based on the luminance levels of the input picture signals Din is performed on the backlight 3, a reduction in power consumption and a dynamic range expansion are achievable, while display luminance is maintained.

(2. Chromaticity Point Adjustment)

Next, as one of characteristic parts of the disclosure, chromaticity point adjustment in the case where the four-color RGBW sub-pixel configuration will be described in detail below in comparison with a comparative example.

Comparative Example

First, in a typical liquid crystal display, light entering from the backlight to the liquid crystal layer is modulated based on the signal level of the picture signal to control the light amount (luminance) of transmission light (display light). The spectral characteristics of transmission light from the liquid crystal layer has tone dependency, and the transmittance peak shifts to a shorter wavelength (a blue light side) with a decrease in the signal level of the picture signal (for example, refer to FIG. 9). In this case, in the liquid crystal display with a four-color RGBZ(W) sub-pixel configuration, the sub-pixel of Z(W) has high luminance characteristics; therefore, the spectral characteristics of transmission light from the sub-pixel of Z(W) are greatly changed in accordance with the signal level of the picture signal. Accordingly, the chromaticity point of transmission light (display light) from a whole pixel greatly shifts in accordance with the signal level of the picture signal. In particular, in the case where a sub-pixel of W (a sub-pixel W) is used as the sub-pixel of Z as in the case of the embodiment, the color filter is not provided for the sub-pixel of W; therefore, such a shift of the chromaticity point of display light in accordance with the signal level is large.

Figure 9:
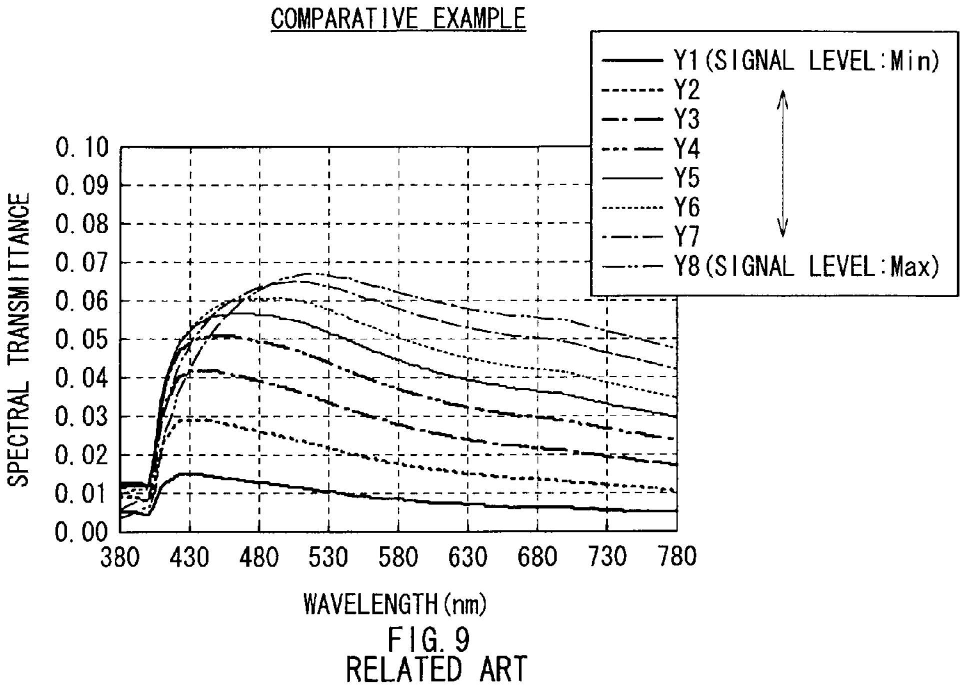
FIG. 9 RELATED ART
FIG. 9 is a plot illustrating an example of wavelength dependency of spectral transmittance in accordance with the signal level of a W signal according to a comparative example.
Figure 10:
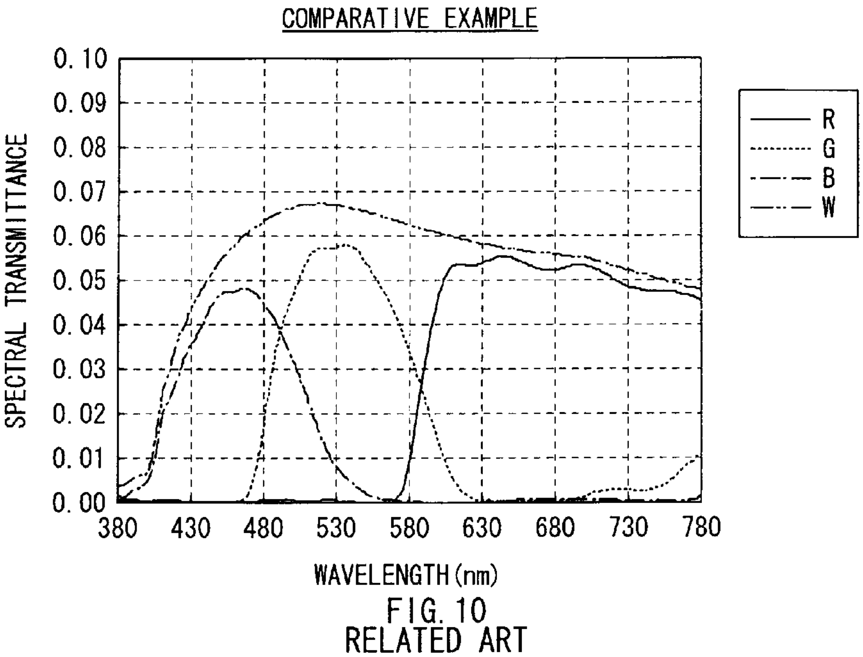
FIG. 10 RELATED ART
FIG. 10 is a plot illustrating an example of wavelength dependency of spectral transmittance in sub-pixels of R, G, B and W according to the comparative example.

For example, in the case where a cell thickness or a drive voltage in the sub-pixel of W is set to allow transmittance in the sub-pixel of W to have relatively high liquid crystal spectral characteristics, that is, to allow the transmittance peak to be located around a wavelength region of G (for example, refer to FIG. 10), the transmittance peak is located in a wavelength region of B at a lower signal level than a maximum signal level in the sub-pixel of W, for example, as illustrated in FIG. 9. FIG. 10 illustrates spectral transmittance in the sub-pixels R, G, B and W.

Figure 11:
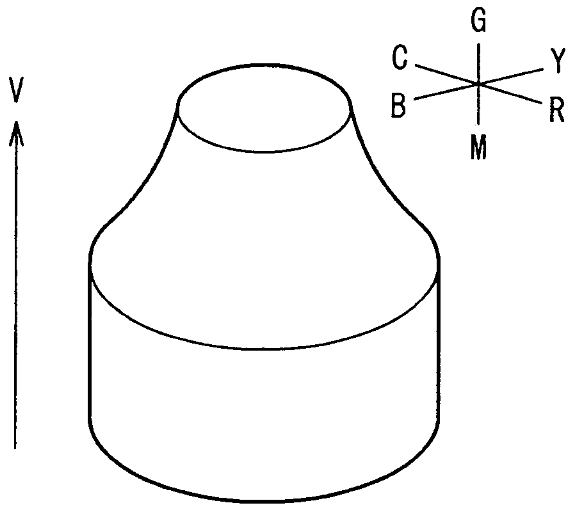
FIG. 11 is a plot illustrating, in an HSV color space, an example of ideal color reproduction characteristics in a RGBW sub-pixel configuration.
Figure 12:
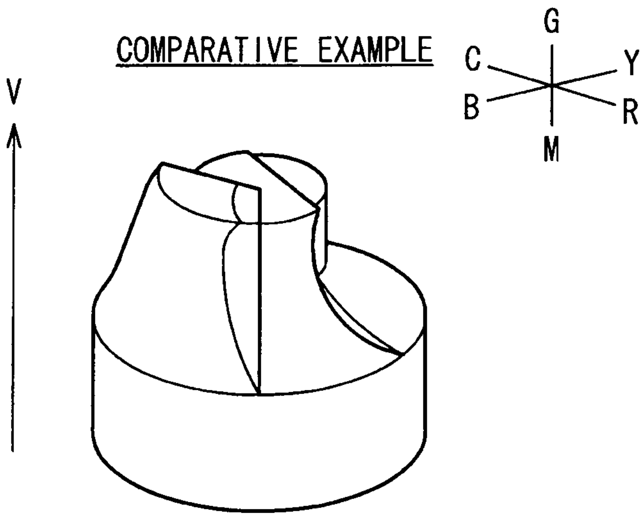
FIG. 12 RELATED ART
FIG. 12 is a plot illustrating, in an HSV color space, an example of color reproduction characteristics in a RGBW sub-pixel configuration according to the comparative example.

In this case, ideal color reproduction characteristics in the four-color RGBW sub-pixel configuration represented by an HSV color space are, for example, as illustrated in FIG. 11 under a condition that the transmittance peak in the above-described sub-pixel of W is not changed. In other words, the color reproduction characteristics are represented by a rotationally symmetric color space with respect to a white chromaticity point as a center. However, actually, as described above, the transmittance peak in the sub-pixel of W is changed in accordance with the signal level; therefore, color reproduction characteristics in the four-color RGBW sub-pixel configuration in a comparative example (related art) are, for example, as illustrated in FIG. 12. More specifically, while a bright region (with a large value of brightness V) is present in a color (hue) from white (W) to blue (B), a dark region (with a small value of brightness V) is present in a color range (hue) from magenta (M) to cyan (C) with respect to yellow (Y) as a center. It is to be noted that, for example, a result obtained by multiplying the brightness V in the HSV space illustrated in FIGS. 11 and 12 by a white luminance improvement ratio is an HSV color space in consideration of a white luminance improvement ratio in the liquid crystal display with the four-color RGBW sub-pixel configuration. A higher value of the brightness V at this time indicates a higher effect of reducing power consumption.

Figure 13:
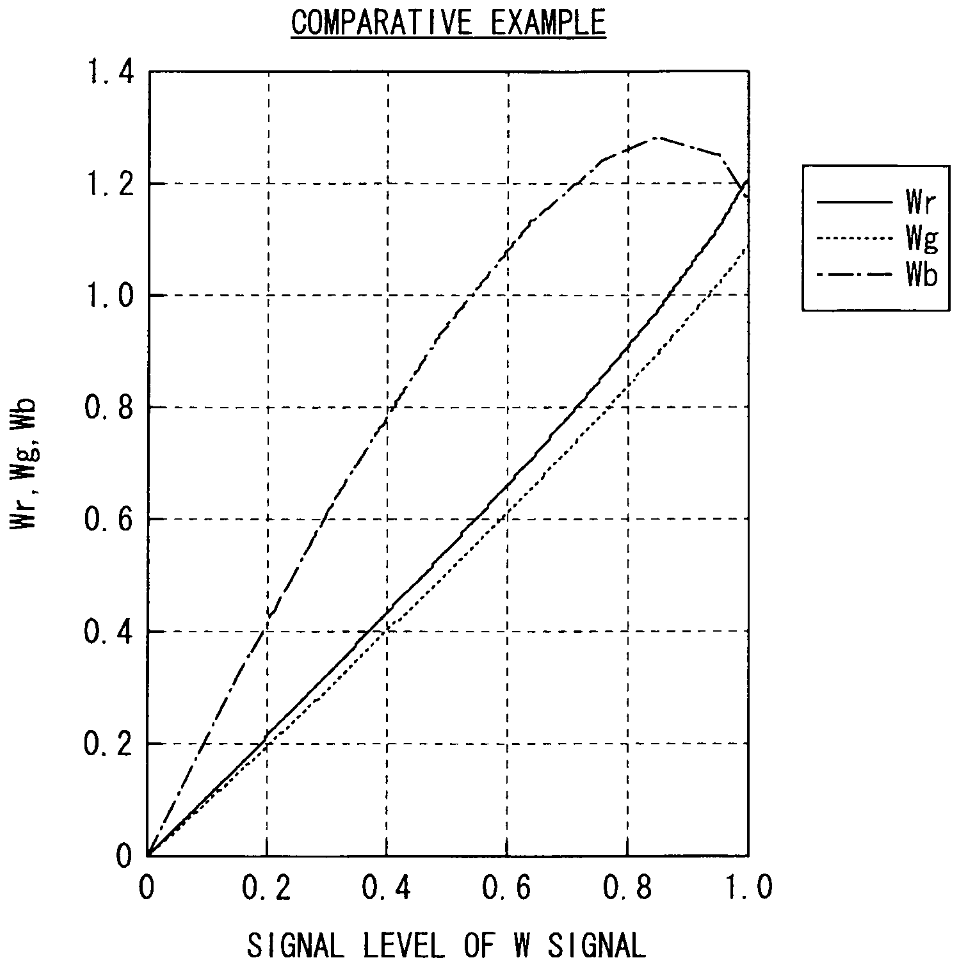
FIG. 13 RELATED ART
FIG. 13 is a plot illustrating an example of a relationship between the signal level of a W signal and a signal level in the case where the signal level of the W signal is replaced with those of R, G and B signals in the RGBW sub-pixel configuration according to the comparative example.

Moreover, FIG. 13 illustrates an example of a relationship between the signal level of the sub-pixel of W (the signal level of the W signal) and the above-described (Wr, Wg, Wb)

(values obtained by replacing the signal level in the sub-pixel of W with the signal levels in the sub-pixels of R, G and B) in the four-color RGBW sub-pixel configuration according to the comparative example. For example, as in the case illustrated in FIG. 11, in the case where the transmittance peak in the sub-pixel of W is not changed, the signal level of the W signal and Wr, Wg and Wb have a proportional relationship (linearity) therebetween. However, in the comparative example, as described above, the transmittance peak in the sub-pixel of W is changed in accordance with the signal level; therefore, Wr, Wg and Wb are functions having a gradient depending on the signal level of the W signal (Wr, Wg and Wb have nonlinearity).

In this case, when the conversion matrix $M_{d2 \rightarrow d3}$ from the picture signals D2 to the picture signals D3 according to the comparative example is set, the following expression (21) is established. More specifically, the conversion matrix $M_{d2 \rightarrow d3}$ according to the comparative example is set in the following manner. First, as a precondition, primary color chromaticity points in picture signals (for example, the picture signals D2) corresponding to three colors R, G and B and primary color chromaticity points in picture signals (for example, the picture signals D3) corresponding to four colors R, G, B and W are the same as each other. Moreover, in the case where the picture signals D2 indicate W (all-white signals: D2$r$=D2$g$=D2$b$=1), (D3$r$=D3$g$=D3$b$=D3$w$=1) is established to set the signal levels of the picture signals D3 to a maximum level. It is to be noted that in the expression (21), Wmaxr, Wmaxg and Wmaxb correspond to Wr, Wg and Wb in the case of D3$w$=1, respectively.

$$M_{d2 \rightarrow d3} = \begin{pmatrix} W_{maxr}+1 & 0 & 0 \\ 0 & W_{maxg}+1 & 0 \\ 0 & 0 & W_{maxb}+1 \end{pmatrix} \quad (21)$$

Figure 14A:
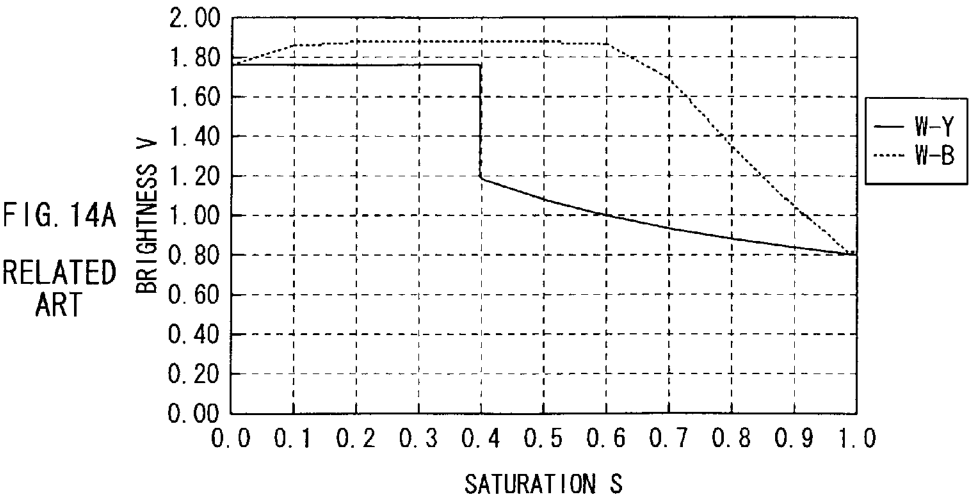
FIG. 14A RELATED ART
FIGS. 14A and 14B are plots illustrating an example of a relationship between saturation and brightness or an inverse thereof in each of hues of B and Y according to the comparative example.
Figure 14B:
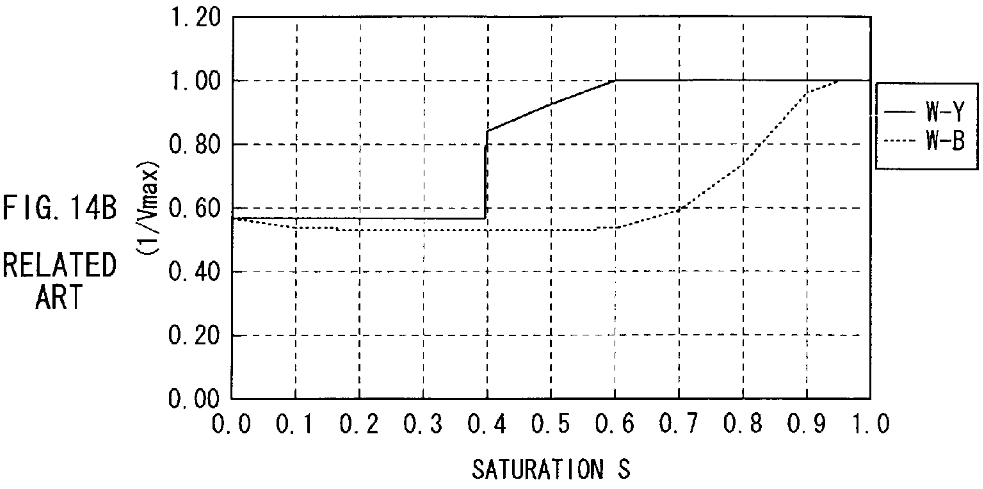
FIG. 14B RELATED ART

Next, FIG. 14A illustrates an example of a relationship between saturation S and brightness V in the four-color RGBW sub-pixel configuration according to the comparative example in each of hues of B and Y described above in FIG. 12. More specifically, FIG. 14A illustrates the value of the brightness V in each of hues of B and Y in the case where the saturation S is changed from 0 to 1. Moreover, FIG. 14B illustrates a relationship between the saturation S and an inverse (1/Vmax) of the brightness V in characteristics illustrated in FIG. 14A. A smaller value of the inverse (1/Vmax) of the brightness V indicates a higher power consumption reduction ratio in the four-color RGBW sub-pixel configuration (a reduction ratio with respect to the three-color RGB sub-pixel configuration). Moreover, the case where the inverse (1/Vmax) of the brightness V exceeds 1 means a decline in display luminance in the four-color RGBW sub-pixel configuration (compared to the three-color RGB sub-pixel configuration). However, in FIG. 14B (and the following drawings), even in the case where the inverse (1/Vmax) of the brightness V exceeds 1, the value of the inverse is represented as 1.

It is obvious from FIGS. 14A and 14B that in the case where the hues of the maximum values of the picture signals corresponding to R, G and B are present near B, the power consumption reduction ratio is relatively reduced, and in the case where the value of the saturation S in the hue of Y is larger than 0.6, the display luminance is reduced. Typically, in a natural image (an object color irradiated with sunlight), the maximum value of the picture signal is often present in a hue near Y; therefore, in the comparative example, a decline in display luminance of yellow frequently occurs. It is to be noted that the conversion matrix $M_{d2 \rightarrow d3}$ according to the comparative example in this case is represented by the following expression (22).

$$M_{d2 \rightarrow d3} = \begin{pmatrix} 2.208 & 0 & 0 \\ 0 & 2.008 & 0 \\ 0 & 0 & 2.163 \end{pmatrix} \quad (22)$$

As described above, in the liquid crystal display with the four-color RGBZ sub-pixel configuration according to the comparative example, a shift of the chromaticity point of display light (a color shift) in accordance with the signal level of the picture signal occurs, thereby causing a decline in image quality. Moreover, in the case where active control of the backlight luminance is used in combination, advantages such as a reduction in power consumption and a dynamic range expansion may not be obtained sufficiently.

(Chromaticity Point Adjustment in Embodiment)

Figure 15:
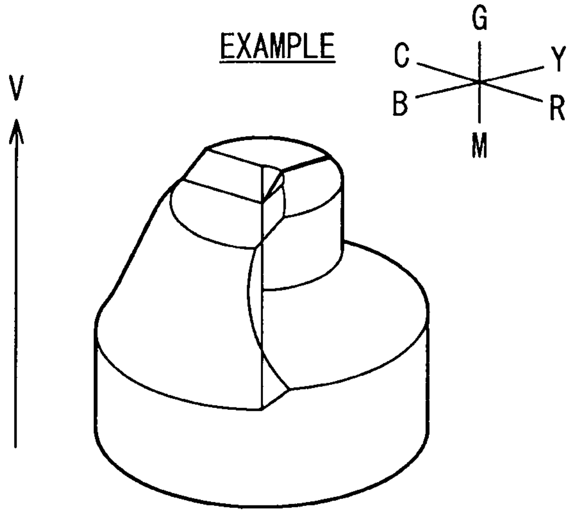
FIG. 15 is a plot illustrating, in an HSV color space, an example of color reproduction characteristics in a RGBW sub-pixel configuration according to the embodiment in the case where a backlight is used.

On the other hand, in the embodiment, first, the chromaticity point of emission light from the backlight 3 is set to a position deviated from the white chromaticity point. More specifically, in this case, the chromaticity point of emission light from the backlight 3 is set to a side closer to yellow (Y) than the white chromaticity point. Therefore, for example, as in the case of color reproduction characteristics in the HSV color space in an example illustrated in FIG. 15, compared to the comparative example illustrated in FIG. 12, in a color range (hue) from magenta (M) to cyan (C) with respect to yellow (Y) as a center, a bright region (with a large value of brightness V) is allowed to be produced.

However, when the chromaticity point of emission light from the backlight 3 is set to be deviated from the white chromaticity point (to be closer to Y) without exception, the following issue occurs. Even in the case where the picture signals D2 indicate W (all-white signals; D2$r$=D2$g$=D2$b$=1), the chromaticity point of display light is located on a Y side (a color temperature is reduced), therefore, the chromaticity point of the display light is deviated from the white chromaticity point.

Therefore, in the embodiment, the chromaticity point adjustment section 423 in the output signal generation section 42 further performs a predetermined chromaticity point adjustment on the picture signals D2 (D2$r$, D2$g$ and D2$b$) to generate the picture signals D3 (D3$r$, D3$g$ and D3$b$). More specifically, in the case where the picture signals D2 (D1) are picture signals indicating W, the chromaticity point adjustment is performed to adjust, to the white chromaticity point, the chromaticity point of display light emitted from the liquid crystal display panel 2 based on emission light from the backlight 3. Then, the RGB/RGBW conversion section 424 performs the above-described RGB/RGBW conversion process on the picture signals D3 (D3$r$, D3$g$ and D3$b$) as a resultant of such a chromaticity point adjustment to generate the picture signals D4 (D4$r$, D4$g$, D4$b$ and D4$w$) corresponding to four colors R, G, B and W.

At this time, the chromaticity point adjustment section 423 performs such a chromaticity point adjustment with use of, for example, the conversion matrix $M_{d2 \rightarrow d3}$ specified by the above-described expression (4). In other words, the picture signals D3 (the pixel signals D3$r$, D3$g$ and D3$b$) are generated by multiplying the picture signals D2 (the pixel signals D2$r$, D2$g$ and D2$b$) by the conversion matrix $M_{d2 \rightarrow d3}$ (by performing a matrix operation).

Therefore, in the embodiment, even if a peak wavelength region in emission light (transmission light) from the sub-pixel 20W is changed in accordance with the magnitudes of the luminance levels (signal levels) of the picture signals D4, in the case where the picture signals D2 are picture signals indicating W, the chromaticity point of display light indicates the white chromaticity point. In other words, a color shift of display light caused by a change in the peak wavelength region in the emission light from the sub-pixel 20W is reduced.

Figure 16A:
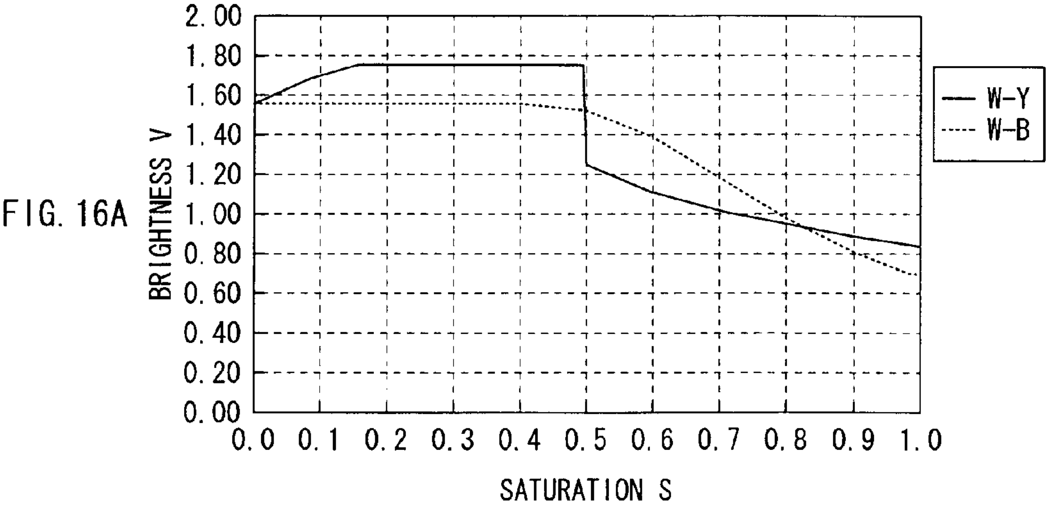
FIGS. 16A and 16B are plots illustrating a relationship between saturation and brightness or an inverse thereof in each of hues of B and Y in Example 1 according to the embodiment.
Figure 16B:
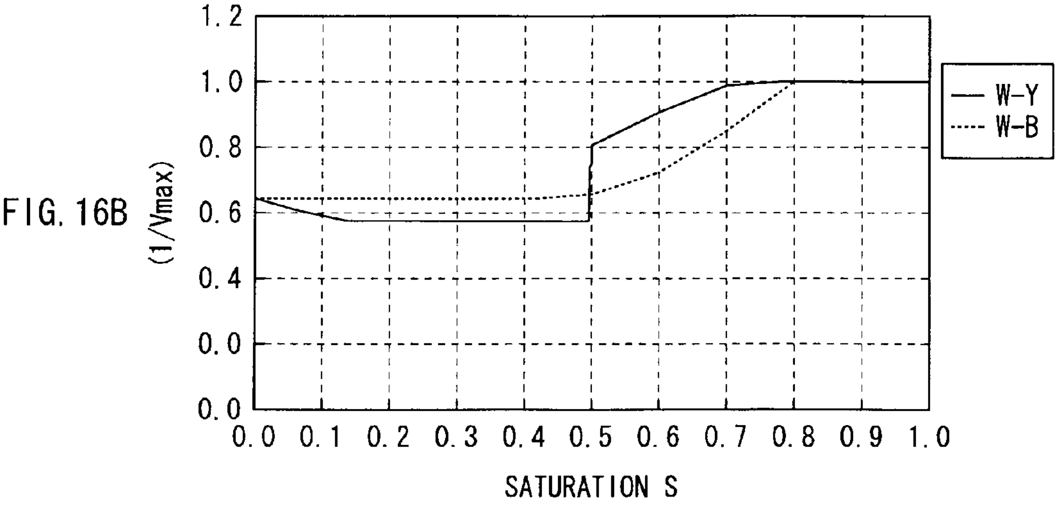

More specifically, in Example 1 illustrated in FIGS. 16A and 16B, a chromaticity point (x, y) of emission light from the backlight 3 was set to (x, y)=(0.300, 0.310) (at a color temperature of approximately 8000 K). Moreover, as the above-described conversion matrix $M_{d2 \rightarrow d3}$, a conversion matrix represented by the following expression (23) was used. Therefore, when the picture signals D2 were picture signals indicating W, the chromaticity point (x, y) of the display light indicated (x, y)=(0.280, 0.288) (at a color temperature of approximately 10000 K). FIGS. 16A and 16B illustrate a relationship between the saturation S and the brightness V or an inverse (1/Vmax) of the brightness V in each of hues of B and Y in Example 1 as in the case of FIGS. 14A and 14B which are described above. It is obvious from FIGS. 16A and 16B that in Example 1, compared to the above-described comparative example illustrated in FIGS. 14A and 14B, the color shift of display light is reduced (a difference between the hues of B and Y is reduced). Moreover, it is obvious that in Example 1, in the hue of Y, correct display luminance is reproduced at a saturation S of approximately 0 to 0.8 (display luminance is not reduced).

$$M_{d2 \rightarrow d3} = \begin{pmatrix} 1.926 & 0 & 0 \\ 0 & 2.108 & 0 \\ 0 & 0 & 2.594 \end{pmatrix} \quad (23)$$

Figure 17A:
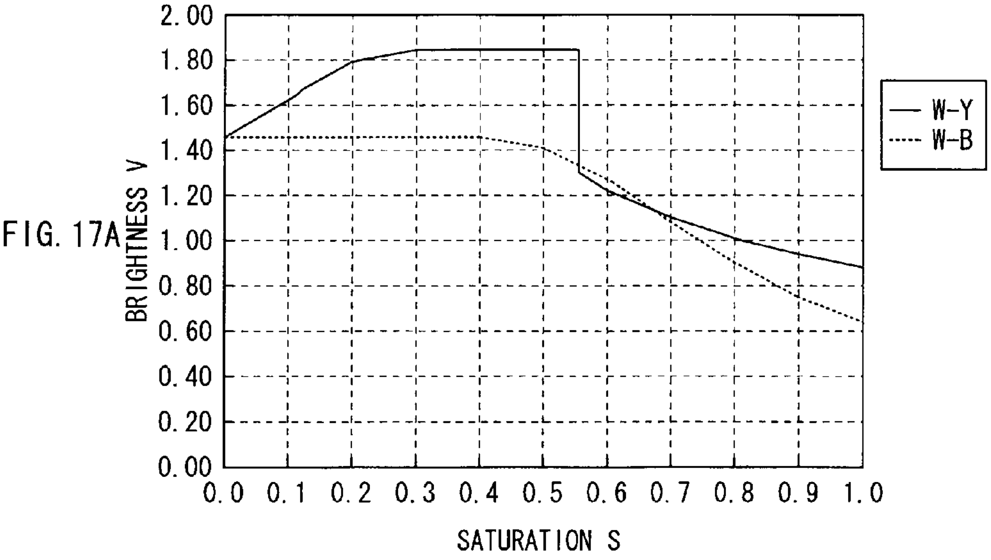
FIGS. 17A and 17B are plots illustrating a relationship between saturation and brightness or an inverse thereof in each of hues of B and Y in Example 2 according to the embodiment.
Figure 17B:
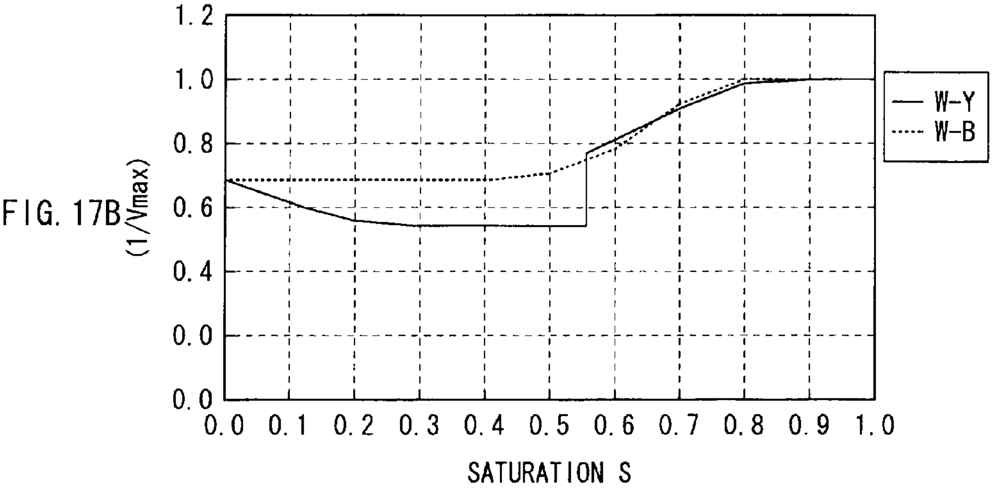

Moreover, in Example 2 illustrated in FIGS. 17A and 17B, the chromaticity point (x, y) of emission light from the backlight 3 was set to (x, y)=(0.304, 0.322). Moreover, as the above-described conversion matrix $M_{d2 \rightarrow d3}$, a conversion matrix represented by the following expression (24) was used. Therefore, when the picture signals D2 were picture signals indicating W, the chromaticity point (x, y) of the display light indicated (x, y)=(0.280, 0.288) (at a color temperature of approximately 10000 K). FIGS. 17A and 17B illustrate a relationship between the saturation S and the brightness V or an inverse (1/Vmax) of the brightness V in each of hues of B and Y in Example 2 as in the case of FIGS. 14A and 14B which are described above. It is obvious from FIGS. 17A and 17B that also in Example 2, compared to the above-described comparative example illustrated in FIGS. 14A and 14B, the color shift of display light is reduced (a difference between the hues of B and Y is reduced). Moreover, it is obvious that also in Example 2, in the hue of Y, correct display luminance is reproduced at a saturation S of approximately 0 to 0.8 (display luminance is not reduced). Further, in Example 2, in the case where the value of the saturation S is in a range of approximately 0.6 to 0.7, a balance between the brightness V and the inverse (1/Vmax) thereof is maintained in the hues of B and Y (the brightness V and the inverse (1/Vmax) thereof are well balanced).

$$M_{d2 \rightarrow d3} = \begin{pmatrix} 2.012 & 0 & 0 \\ 0 & 2.052 & 0 \\ 0 & 0 & 2.823 \end{pmatrix} \quad (24)$$

As described above, in the embodiment, the chromaticity point of emission light from the backlight 3 is set to a position deviated from the white chromaticity point, and in the case where the picture signals D2 are picture signals indicating W, the chromaticity point adjustment is performed to adjust, to the white chromaticity point, the chromaticity point of display light emitted from the liquid crystal display panel 2 based on the emission light from the backlight 3; therefore, the color shift of display light caused by a change in the peak wavelength region in emission light from the sub-pixel 20W is allowed to be reduced. Therefore, in the case where a picture is displayed with use of the four-color RGBZ sub-pixel configuration, a decline in image quality caused by the color shift is allowed to be reduced. Moreover, a decline in display luminance in the case where a picture is displayed with use of the four-color RGBW sub-pixel configuration is allowed to be reduced. Further, in a picture in which luminance close to Y is high, a reduction in power consumption is achievable while a picture failure is prevented.

Moreover, in the output signal generation section 42, a dimming process is performed by the BL level calculation section 421 and the LCD level calculation section 422, and based on the picture signals D2 (D2*r*, D2*g* and D2*b*) as resultants of the diming process, the chromaticity point adjustment section 423 performs the above-described chromaticity adjustment, and the RGB/RGBW conversion section 424 performs RGB/RGBW conversion (a color conversion process); therefore, a decline in image quality caused by the above-described color shift is allowed to be further reduced. In other words, compared to the case where the dimming process is performed on picture signals (picture signals corresponding to four colors R, G, B and W) as resultants of the RGB/RGBW conversion, nonlinearity of Wr, Wg and Wb dependent on the signal level of the W signal caused by a change in a peak wavelength region in emission light (transmission light) from the sub-pixel 20W is allowed to be reduced; therefore, a decline in image quality caused by such a color shift is allowed to be further reduced.

Further, the pixels 20 in the embodiment each include the sub-pixel 20W corresponding to W as an example of the sub-pixel 20Z which will be described later; therefore, it is not necessary to provide a color filter for the sub-pixel 20W, and in particular, an improvement in luminance efficiency (a reduction in power consumption) is achievable.

MODIFICATIONS

Next, modifications (Modifications 1 and 2) of the above-described embodiment will be described below. It is to be noted that like components are denoted by like numerals as of the above-described embodiment and will not be further described.

Modification 1

A liquid crystal display according to Modification 1 has the same configuration as that in the liquid crystal display 1 according to the above-describe embodiment, except that to limit a blue component of spectral transmittance in the sub-pixel 20W in the liquid crystal display 1, a small amount of a yellow pigment is additionally dispersed in the sub-pixel 20W.

Examples of such a yellow pigment include C.I. Pigment Yellow 1, 2, 3, 4, 5, 6, 10, 12, 13, 14, 15, 16, 17, 18, 24, 31, 32, 34, 35, 35:1, 36, 36:1, 37, 37:1, 40, 42, 43, 53, 55, 60, 61, 62, 63, 65, 73, 74, 77, 81, 83, 93, 94, 95, 97, 98, 100, 101, 104, 106, 108, 109, 110, 113, 114, 115, 116, 117, 118, 119, 120, 123, 126, 127, 128, 129, 147, 151, 152, 153, 154, 155, 156, 161, 162, 164, 166, 167, 168, 169, 170, 171, 172, 173, 174, 175, 176, 177, 179, 180, 181, 182, 187, 188, 193, 194, 198, 199, 213 and 214.

Figure 18:
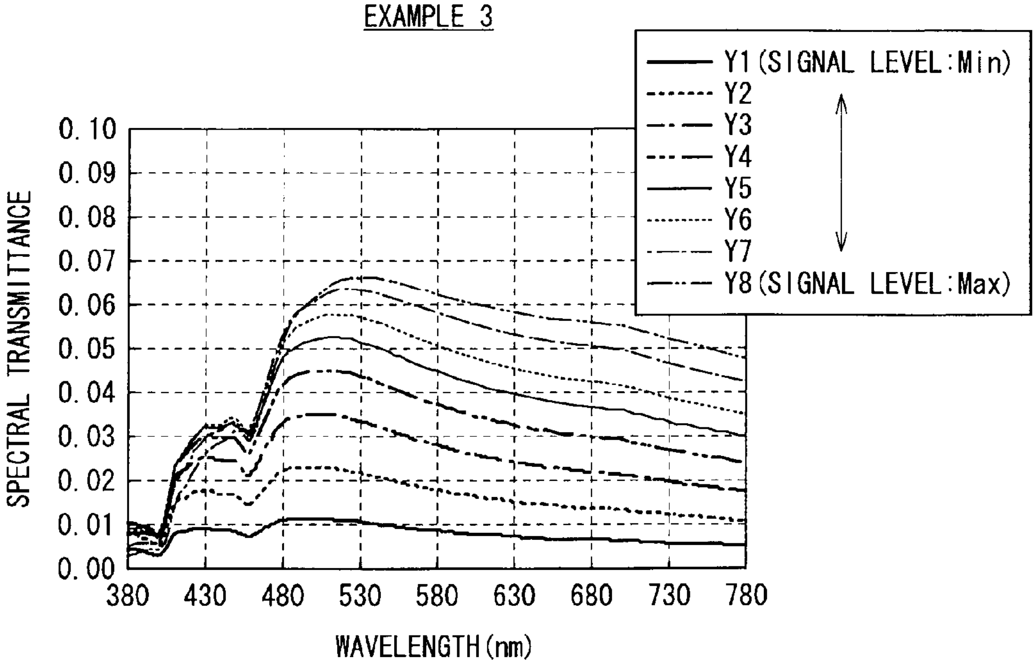
FIG. 18 is a plot illustrating an example of wavelength dependency of spectral transmittance in accordance with the signal level of a W signal in Example 3 according to Modification 1.
Figure 19:
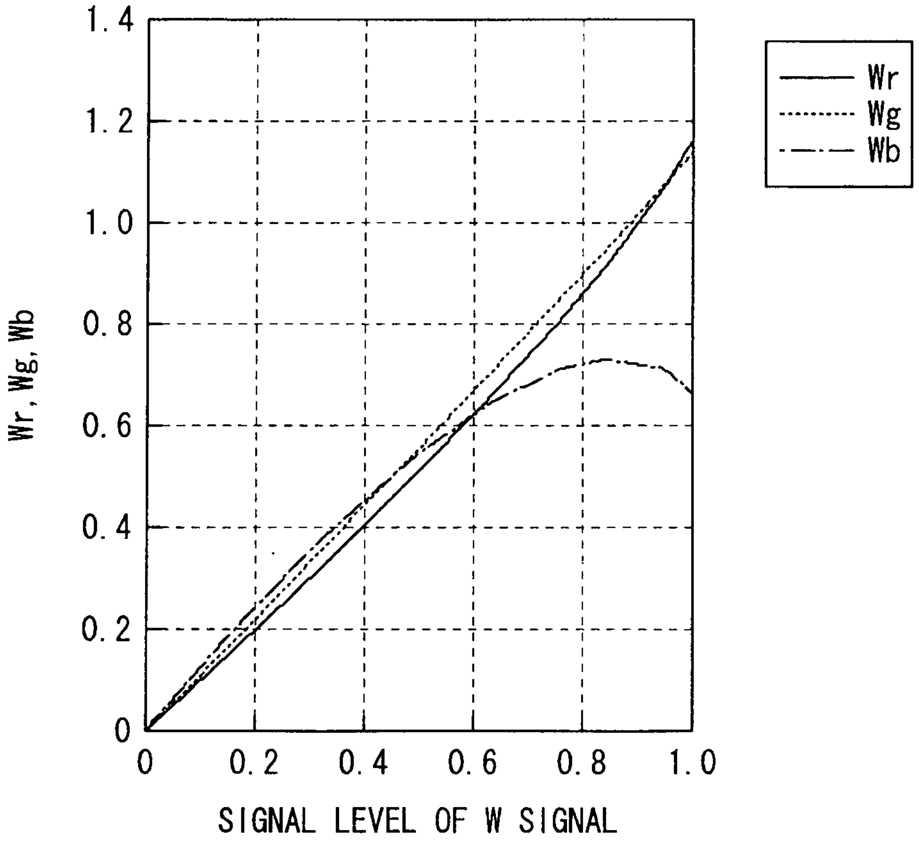
FIG. 19 is a plot illustrating an example of a relationship between the signal level of the W signal and a signal level in the case where the signal level of the W signal is replaced with those of R, G and B signals in Example 3 according to Modification 1.

Therefore, in the modification, as illustrated in Example 3 in FIG. 18, a change in the peak wavelength region in emission light (transmission light) from the sub-pixel 20W in accordance with the magnitude of the luminance level (signal level) of the pixel signal D4*w* is reduced. Moreover, for example, as illustrated in FIG. 19, nonlinearity of Wr, Wg and Wb dependent on the signal level of the W signal caused by a change in the peak wavelength region in the emission light (transmission light) from the sub-pixel 20W is also reduced. It is to be noted that in characteristics illustrated in FIG. 19, it is desirable to set the additive amount (dispersed amount) of the above-described yellow pigment to allow Wr, Wg and Wb in a range where the signal level of the W signal is low to have values close to one another.

Figure 20A:
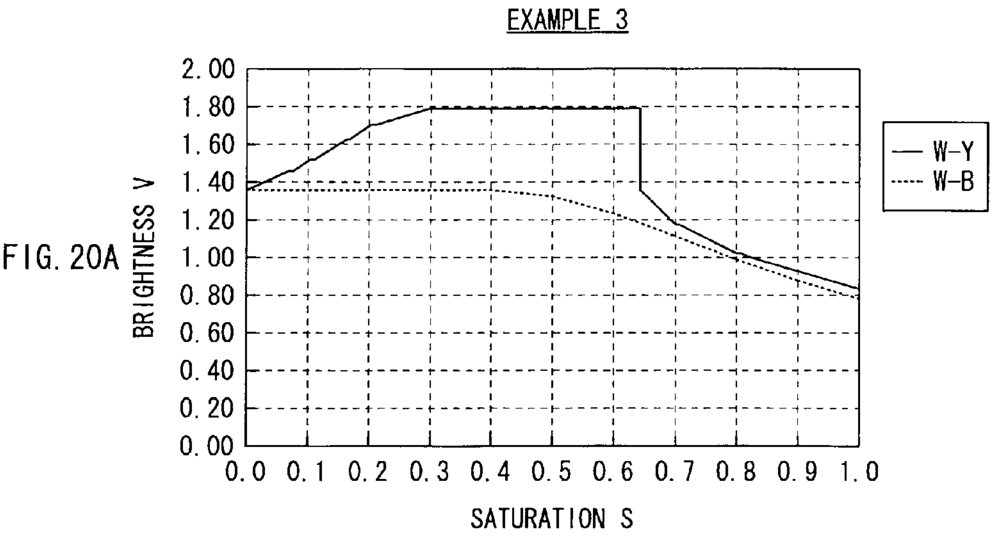
FIGS. 20A and 20B are plots illustrating a relationship between saturation and brightness or an inverse thereof in each of hues of B and Y in Example 3 according to Modification 1.
Figure 20B:
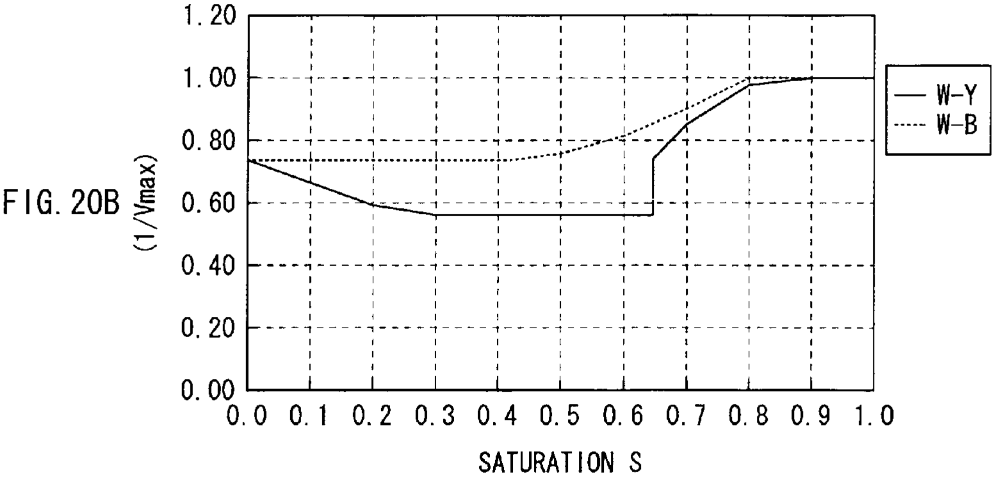

FIGS. 20A and 20B illustrate a relationship between the saturation S and the brightness V or an inverse (1/Vmax) of the brightness V in each of hues of B and Y in Example 3 as in the case of FIGS. 14A and 14B which are described above. In Example 3, the chromaticity point (x, y) of emission light from the backlight 3 was set to (x, y)=(0.302, 0.326). Moreover, as the above-described conversion matrix $M_{d2\rightarrow d3}$, a conversion matrix indicated by the following expression (25) was used. Therefore, in the case where the picture signals D2 were picture signals indicating W, the chromaticity point (x, y) of display light indicated (x, y)=(0.280, 0.288) (at a color temperature of approximately 10000 K). It is obvious from FIGS. 20A and 20B that also in Example 3, compared to the above-described comparative example illustrated in FIGS. 14A and 14B, the color shift of display light is reduced (a difference between the hues of B and Y is reduced). Moreover, it is obvious that also in Example 3, in the hue of Y, correct display luminance is reproduced at a saturation S of approximately 0 to 0.8 (display luminance is not reduced). Further, in Example 3, in the case where the value of the saturation S is in a range of approximately 0.6 to 0.8, a balance between the brightness V and the inverse (1/Vmax) thereof is maintained in the hues of B and Y (the brightness V and the inverse (1/Vmax) thereof are well balanced).

$$M_{d2\rightarrow d3} = \begin{pmatrix} 2.058 & 0 & 0 \\ 0 & 2.080 & 0 \\ 0 & 0 & 2.219 \end{pmatrix} \quad (25)$$

As described above, in the modification, a small amount of the yellow pigment is dispersed in the sub-pixel 20W; therefore, in addition to the effects in the above-described embodiment, in a wide range of saturation S, a balance between the brightness V and the inverse (1/Vmax) thereof is allowed to be maintained (the brightness V and the inverse (1/Vmax) thereof is allowed to be well balanced).

Modification 2

A liquid crystal display according to Modification 2 has the same configuration as that in the liquid crystal display 1 according to the above-described embodiment, except that a liquid crystal display panel including pixels 20-1 and a RGB/RGBZ conversion section 424A are arranged instead of the liquid crystal display panel 2 including the pixels 20 and the RGB/RGBW conversion section 424, respectively.

(Sub-Pixel Configuration of Pixel 20-1)

Figure 21A:
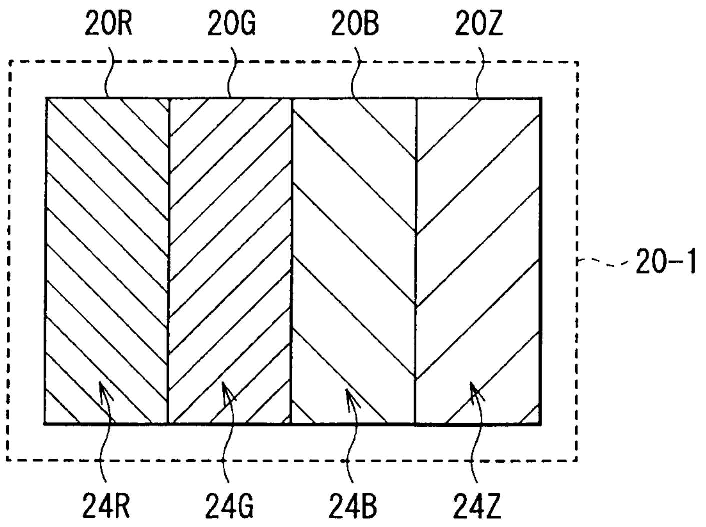
FIGS. 21A and 21B are schematic plan views illustrating a sub-pixel configuration example of a pixel according to Modification 2.
Figure 21B:
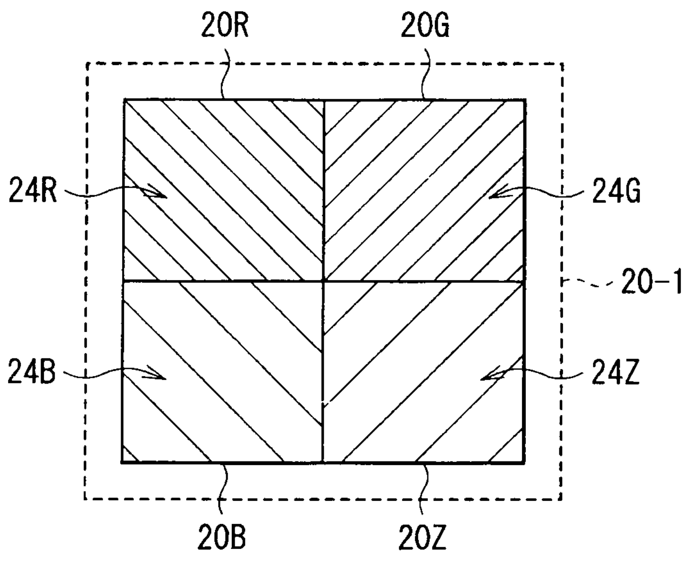

FIGS. 21A and 21B illustrate schematic plan views of a sub-pixel configuration example of each pixel 20-1 in the modification, and correspond to FIGS. 2A and 2B in the above-described embodiment. Each pixel 20-1 includes the sub-pixels 20R, 20G and 20B corresponding to three colors R, G and B as in the case of the above-described embodiment, and a sub-pixel 20Z of a color (Z) with higher luminance than these three colors. Examples of the color (Z) with higher luminance include yellow (Y) and white (W); however, in the modification, the color (Z) will be described as a broader concept of these colors. As in the case of the above-describe embodiment, color filters 24R, 24G and 24B corresponding to the colors R, G and B are provided for the sub-pixels 20R, 20G and 20B corresponding to three colors R, G and B, respectively, in the sub-pixels 20R, 20G, 20B and 20Z of four colors R, G, B and Z. On the other hand, for example, in the case of Z=Y, a color filter (a color filter 24Z illustrated in the drawings) corresponding to Y is provided for the sub-pixel 20Z of Z. However, as described in the above-described embodiment, in the case of Z=W, the color filter is not provided for the sub-pixel 20Z (the sub-pixel 20W). Also in the pixels 20-1 in the modification, the arrangement of the sub-pixels 20R, 20G, 20B and 20Z is not limited thereto, and the sub-pixels 20R, 20G, 20B and 20Z may be arranged in any other form.

(RGB/RGBZ Conversion Section 424*a*)

The RGB/RGBZ conversion section 424A performs a predetermined RGB/RGBZ conversion process (a color conversion process) on the picture signals D3 (the pixel signals D3*r*, D3*g* and D3*b*) corresponding to three colors R, G and B supplied from the chromaticity point adjustment section 423. Therefore, the picture signals D4 (D4*r*, D4*g*, D4*b* and D4*z*) corresponding to four colors R, G, B and Z are generated.

Figure 22:
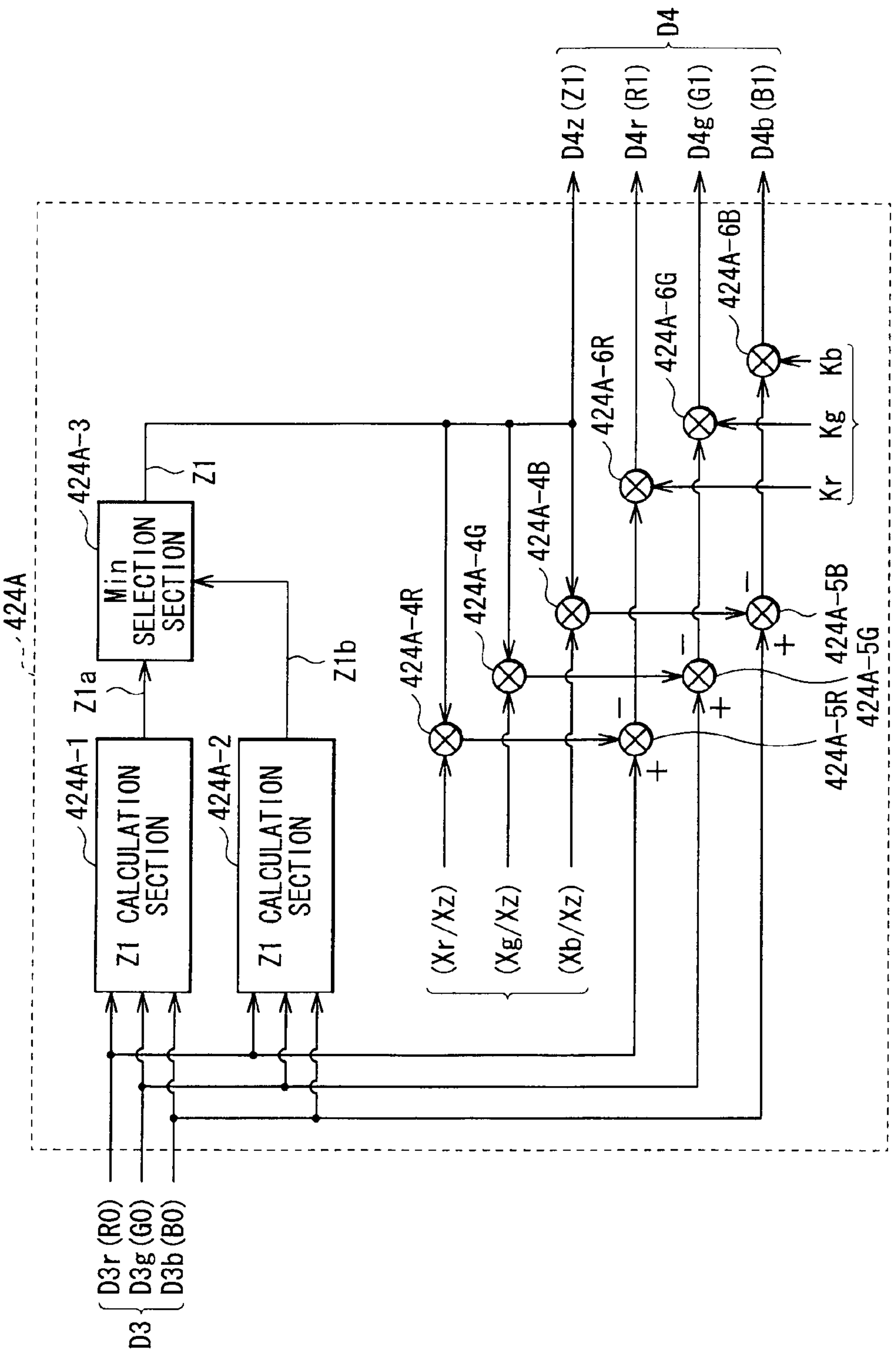
FIG. 22 is a block diagram illustrating a specific configuration of a RGB/RGBZ conversion section arranged in an output signal generation section according to Modification 2.

FIG. 22 illustrates a block configuration of the RGB/RGBZ conversion section 424A. The RGB/RGBZ conversion section 424A includes a Z1 calculation section 424A-1, a Z1 calculation section 424A-2, a Min selection section 424A-3, multiplication sections 424A-4R, 424A-4G and 424A-4B, subtraction sections 424A-5R, 424A-5G and 424A-5B and multiplication sections 424A-6R, 424A-6G and 424A-6B. In this case, the pixel signals D3*r*, D3*g* and D3*b* as input signals are referred to as R0, G0 and B0, respectively, and the pixel signals D4*r*, D4*g*, D4*b* and D4*z* as output signals are referred to as R1, G1, B1 and Z1, respectively. It is to be noted that expressions in the RGB/RGBZ conversion process in the whole RGB/RGBZ conversion section 424A is basically the same as those in the RGB/RGBW conversion process described in the above-described embodiment.

The Z1 calculation section 424A-1 determines Z1*a* as a candidate value for Z1 with use of the above-described expression (12) based on the pixel signals D3*r*, D3*g* and D3*b* (R0, G0 and B0).

The Z1 calculation section 424A-2 determines Z1*b* as a candidate value for Z1 with use of the above-described expression (13) based on the pixel signals D3*r*, D3*g* and D3*b* (R0, G0 and B0).

The Min selection section 424A-3 selects a smaller value from Z1*a* supplied from the Z1 calculation section 424A-1 and Z1*b* supplied from the Z1 calculation section 424A-2 to output the selected value as Z1 which is a final value (the pixel signal D4*z*) as described above.

The multiplication section 424A-4R multiplies Z1 supplied from the Min selection section 424A-3 by a preset constant (Xr/Xz) described in the above-described embodiment to output a resultant. The multiplication section 424A-4G multiplies Z1 supplied from the Min selection section 424A-3 by a present constant (Xg/Xz) described in the above-described embodiment to output a resultant. The multiplication section 424A-4B multiplies Z1 supplied from the Min selection section 424A-3 by a preset constant (Xb/Xz) described in the above-described embodiment to output a resultant.

The subtraction section 424A-5R subtracts an output value (a multiplication value) from the multiplication section 424A-4R from the pixel signal D3*r* (R0) to output a resultant. The subtraction section 424A-5G subtracts an output value (a multiplication value) from the multiplication section 424A-4G from the pixel signal D3*g* (G0) to output a resultant. The subtraction section 424A-5B subtracts an output value (a multiplication value) from the multiplication section 424A-4B from the pixel signal D3*b* (B0) to output a resultant.

The multiplication section 424A-6R multiplies a preset constant Kr described in the above-described embodiment by an output value (a subtraction value) from the subtraction section 424A-5R to output a resultant as the pixel signal D4*r* (R1). The multiplication section 424A-6G multiplies a preset constant Kg described in the above-described embodiment by an output value (a subtraction value) from the subtraction section 424A-5G to output a resultant as the pixel signal D4*g* (G1). The multiplication section 424A-6B multiplies a preset constant Kb described in the above-described embodiment by an output value (a subtraction value) from the subtraction section 424A-5B to output a resultant as the pixel signal D4*b* (B1).

Also in the liquid crystal display with such a configuration according to the modification, the same effects are obtainable by the same functions as those in the liquid crystal display 1 according to the above-described embodiment. In other words, when a picture is displayed with use of the four-color RGBZ sub-pixel configuration, a decline in image quality caused by a color shift is allowed to be reduced.

It is to be noted that also in the liquid crystal display according to the modification, as in the case of Modification 1, a small amount of a yellow pigment may be dispersed in the sub-pixel 20Z.

Other Modifications

Although the present disclosure is described referring to the embodiment and the modifications, the disclosure is not limited thereto, and may be variously modified.

For example, in the above-described embodiment and the like, the case where active control is performed on an entire backlight as a control unit is described; however, the backlight may be divided into a plurality of subsections, and active control may be performed on respective subsections of the backlight.

Moreover, in the above-described embodiment, the case where active control based on the picture signal is performed on the backlight is described; however, the disclosure is applicable to the case where such active control is not performed on the backlight.

Further, in the above-described embodiment and the like, the case where the four-color RGBZ sub-pixel configuration is used is described; however, the disclosure is applicable to a five or more-color sub-pixel configuration including a sub-pixel corresponding to other color in addition to sub-pixels of these four colors.

In addition, the processes described in the above-described embodiment and the like may be performed by hardware or software. In the case where the processes are performed by software, a program forming the software is installed in a general-purpose computer or the like. Such a program may be stored in a recording medium mounted in the computer in advance.

The present application contains subject matter related to that disclosed in Japanese Priority Patent Application JP 2010-168424 filed in the Japan Patent Office on Jul. 27, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display comprising:

a light source section;

a liquid crystal display panel including a plurality of pixels each configured of sub-pixels of three colors red (R), green (G) and blue (B) and a sub-pixel of a color (Z) with higher luminance than the three colors, and modulating, based on input picture signals corresponding to the three colors R, G and B, emission light from the light source section to display a picture; and a display control section including an output signal generation section which performs a predetermined conversion process based on the input picture signals to generate output picture signals corresponding to four colors R, G, B and Z, and performing a display drive on each of the sub-pixels of R, G, B and Z in the liquid crystal display panel with use of the output picture signals, wherein a chromaticity point of the emission light from the light source section is set to a position deviated from a white chromaticity point, and in the case where the input picture signals are picture signals indicating white (W), the output signal generation section performs a chromaticity point adjustment in the conversion process to adjust, to the white chromaticity point, a chromaticity point of display light emitted from the liquid crystal display panel based on the emission light from the light source section.

2. The liquid crystal display according to claim 1, wherein the output signal generation section performs, as the conversion process, the chromaticity point adjustment based on the input picture signals and a predetermined color conversion process on picture signals as resultants of the chromaticity point adjustment, thereby generating the output picture signals.

3. The liquid crystal display according to claim 2, wherein the output signal generation section generates a lighting signal in the light source section based on the input picture signals and performs a predetermined diming process based on the input picture signals and the lighting signal and the chromaticity point adjustment on picture signals as resultants of the dimming process, and the display control section performs the display drive with use of the output picture signals and a light-emission drive on the light source section with use of the lighting signal.

4. The liquid crystal display according to claim 1, wherein each of the pixels includes the sub-pixels of three colors R, G and B, and a sub-pixel of white (W) as the sub-pixel of Z.

5. The liquid crystal display according to claim 4, wherein while color filters corresponding to colors R, G and B are provided for the sub-pixels of the three colors, a color filter is not provided for the sub-pixel of W.

6. The liquid crystal display according to claim 5, wherein the chromaticity point of emission light from the light source section is set to a side closer to yellow (Y) than the white chromaticity point.

7. The liquid crystal display according to claim 6, wherein a yellow pigment is dispersed in the sub-pixel of W.

* * * * *